United States Patent
Gao et al.

(10) Patent No.: US 9,723,576 B2
(45) Date of Patent: Aug. 1, 2017

(54) METHOD AND DEVICE FOR REPORTING POWER HEADROOM UNDER CARRIER AGGREGATION

(71) Applicant: China Academy of Telecommunications Technology, Beijing (CN)

(72) Inventors: Xuejuan Gao, Beijing (CN); Yanan Lin, Beijing (CN); Zukang Shen, Beijing (CN)

(73) Assignee: CHINA ACADEMY OF TELECOMMUNICATIONS TECHNOLOG, Beijing (CN)

( * ) Notice: Subject to any disclaimer, the term of this patent is extended or adjusted under 35 U.S.C. 154(b) by 57 days.

(21) Appl. No.: 14/763,159

(22) PCT Filed: Jan. 26, 2014

(86) PCT No.: PCT/CN2014/071479
§ 371 (c)(1),
(2) Date: Jul. 23, 2015

(87) PCT Pub. No.: WO2014/117696
PCT Pub. Date: Aug. 7, 2014

(65) Prior Publication Data
US 2015/0358927 A1 Dec. 10, 2015

(30) Foreign Application Priority Data
Jan. 29, 2013 (CN) .......................... 2013 1 0034627

(51) Int. Cl.
*H04W 52/36* (2009.01)
*H04L 5/00* (2006.01)
*H04W 72/04* (2009.01)

(52) U.S. Cl.
CPC ............ *H04W 52/365* (2013.01); *H04L 5/001* (2013.01); *H04W 72/0413* (2013.01)

(58) Field of Classification Search
CPC .. H04W 52/365; H04W 72/0413; H04L 5/001
See application file for complete search history.

(56) References Cited

U.S. PATENT DOCUMENTS

| 2010/0158147 A1* | 6/2010 | Zhang | ................. H04W 52/146 375/260 |
| 2011/0312366 A1* | 12/2011 | Yang | ................... H04W 52/365 455/522 |

(Continued)

FOREIGN PATENT DOCUMENTS

| CN | 102104905 A | 6/2011 |
| CN | 102448160 A | 5/2012 |

(Continued)

OTHER PUBLICATIONS

3GPP TS 36.213 V11.1.0, Technical Specification, 3rd Generation Partnership Project; Technical Specification Group Radio Access Network; Evolved Universal Terrestrial Radio Access (E-UTRA); Physical layer procedures; (Release 11), Dec. 2012, 160 Pages.*

(Continued)

*Primary Examiner* — Edan Orgad
*Assistant Examiner* — Ivan O Latorre
(74) *Attorney, Agent, or Firm* — Kilpatrick Townsend & Stockton LLP

(57) ABSTRACT

The present application relates to the field of wireless communications. Disclosed in an embodiment of the present application are a method and device for reporting power headroom (PH) under carrier aggregation, for solving the problem of how to report PH when a terminal supports the transmission of a physical uplink control channel (PUCCH) on different uplink carriers corresponding to different carrier groups. In the present application, a terminal generates a (Continued)

Type 1 PH and a Type 2 PH for each of multiple PUCCH-transmitting uplink carriers requiring PH reporting, generates a Type 1 PH for each non-PUCCH-transmitting uplink carrier requiring PH reporting, and reports each generated Type 1 PH and Type 2 PH to a network side in the current uplink subframe. The present application solves the above problem.

16 Claims, 4 Drawing Sheets

(56) References Cited

U.S. PATENT DOCUMENTS

| | | | | |
|---|---|---|---|---|
| 2012/0044882 A1* | 2/2012 | Kim | ............... | H04L 5/0058 370/329 |
| 2012/0087317 A1* | 4/2012 | Bostrom | ............... | H04W 52/30 370/329 |
| 2012/0113848 A1* | 5/2012 | Kim | ............... | H04W 52/365 370/252 |
| 2012/0182960 A1* | 7/2012 | Wang | ............... | H04W 52/365 370/329 |
| 2012/0294167 A1* | 11/2012 | Zhu | ............... | H04W 52/146 370/252 |
| 2012/0294267 A1* | 11/2012 | Wang | ............... | H04W 52/365 370/329 |
| 2013/0064131 A1* | 3/2013 | Kwon | ............... | H04L 5/0007 370/252 |
| 2013/0176953 A1* | 7/2013 | Stern-Berkowitz | . | H04W 52/146 370/329 |
| 2013/0188570 A1* | 7/2013 | Zhao | ............... | H04L 5/0007 370/329 |
| 2013/0215866 A1* | 8/2013 | Ahn | ............... | H04W 52/04 370/329 |
| 2013/0336228 A1* | 12/2013 | Zhao | ............... | H04W 24/10 370/328 |
| 2014/0029586 A1* | 1/2014 | Loehr | ............... | H04W 56/0005 370/336 |
| 2014/0177602 A1* | 6/2014 | Chen | ............... | H04W 52/04 370/336 |
| 2015/0358920 A1* | 12/2015 | Sorrentino | ............... | H04W 52/146 455/522 |

FOREIGN PATENT DOCUMENTS

| | | |
|---|---|---|
| CN | 102480338 A | 5/2012 |
| EP | 2230866 A1 | 9/2010 |
| JP | 2011097224 A | 5/2011 |
| KR | 20120016987 A | 2/2012 |
| WO | 2011/159222 A1 | 12/2011 |
| WO | 2012/023688 A1 | 2/2012 |

OTHER PUBLICATIONS

Mediatek Inc: "Power control problem of multiple PA", 3GPP TS 36.213 V11.1.0 (Dec. 2012), $3^{RD}$ Generation Partership Project (3GPP), Technical Specification Group Radio Access Network; Evolved Universal Terrestrial Radio Acess (E-UTRA); Physical Layer Procedures, Release 11, 4 pages.

International Search Report for PCT /CN2014/0714 79.

Mediatek Inc: "Power control problem of multiple PA", 3GPP Draft; R2-123688, 3rd Generation Partnership Project (3GPP), Mobile Competence Centre, 650, Route Des Lucioles; F-06921 Sophia-Antipolis Cedex, France, vol. RAN WG2 Aug. 7, 2012 (Aug. 7, 2012), XP850665633, Retrieved from the Internet: URL:http://www.3gpp.org/ftp/tsgran/WG2 RL2/TSGR2 79/Docs/ [retrieved on Aug. 7, 2812].

The Extended European Search Report issued on Oct. 22, 2015 in the EP counterpart application (14746333.5).

* cited by examiner

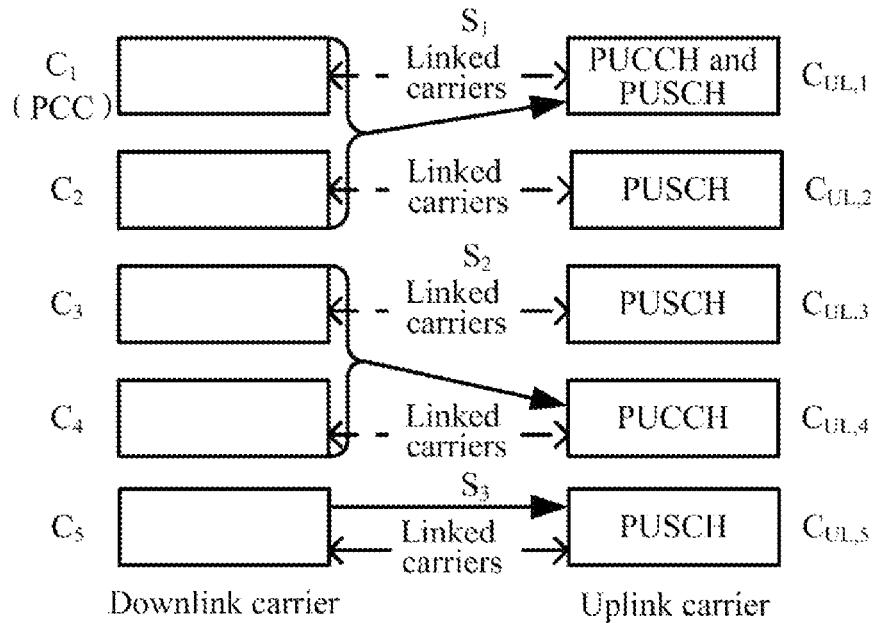

Fig.4

50 — A user equipment generates a Type 1 PH and a Type 2 PH for each of a plurality of uplink carriers, on which PUCCHs can be transmitted, for which PHs need to be reported; and generates a Type 1 PH for each of uplink carriers, for which PHs need to be reported, other than the uplink carriers on which PUCCHs can be transmitted 51 — The user equipment reports the generated respective Type 1 PH and Type 2 PH to the network side in a current uplink sub-frame

Fig.5

METHOD AND DEVICE FOR REPORTING POWER HEADROOM UNDER CARRIER AGGREGATION

This application is a US National Stage of International Application No. PCT/CN2014/071479, filed on Jan. 26, 2014, designating the United States and claiming the priority to Chinese Patent Application No. 201310034627.4, filed with the State Intellectual Property Office of People's Republic of China on Jan. 29, 2013 and entitled "Method and device for reporting power headroom under carrier aggregation", the content of which is hereby incorporated by reference in its entirety.

FIELD

The present invention relates to the field of wireless communications and particularly to a method and device for reporting power headroom under carrier aggregation.

BACKGROUND

In the Long Term Evolution (LTE) and earlier wireless communication systems, there is only one carrier with a bandwidth up to 20 MHz in a cell as illustrated in FIG. 1. In the Long Term Evolution-Advanced (LTE-A) system, there are required peak rates of the system, up to 1 Gbps in the downlink and 500 Mbps in the uplink, as improved significantly over the LTE system. The required peak rates cannot be available with only one carrier with a bandwidth up to 20 MHz. Thus the technology of Carrier Aggregation (CA) has been introduced to the LTE-A system, where a plurality of consecutive or inconsecutive carriers served by the same evolved Node B (eNB) are aggregated together to serve a User Equipment (UE) concurrently as illustrated in FIG. 2. These carriers aggregated together are referred to as Component Carriers (CCs). Each cell can be a component carrier, and cells (component carriers) served by different eNBs cannot be aggregated. In order to ensure backward compatibility with a UE in the LTE system, the bandwidth of each of the carriers should be no more than 20 MHz.

One of the component carriers aggregated for the UE is defined as a Primary Component Carrier (PCC) including a downlink PCC and an uplink PCC, and the remaining component carriers are referred to as Secondary Component Carriers (SCCs).

In the LTE-A Release 10 (Rel-10), each of the component carriers aggregated for the UE corresponds to maximum transmit power $P_{CMAX,c}$ of the carrier, and the maximum transmit power of the carrier lies in the range of values of $P_{CMAX\_L,c} \leq P_{CMAX,c} \leq P_{CMAX\_H,c}$, where $P_{CMAX\_L,c}$ and $P_{CMAX\_H,c}$ are determined by the UE as follows:

In the case of intra-band CA:

$$P_{CMAX\_L,c}=\text{MIN}\{P_{EMAX,c}-T_{C,c}, P_{PowerClass}-\text{MAX}(MPR_c+A\text{-}MPR_c, P\text{-}MPR_c)-T_{C,c}\};\quad\text{Equation 1:}$$

and $$P_{CMAX\_H,c}=\text{MIN}\{P_{EMAX,c}, P_{PowerClass}\};\quad\text{Equation 2:}$$

In the case of inter-band CA:

and $$\text{MIN}\{P_{EMAX,c}-T_{C,c}, P_{PowerClass}-\text{MAX}(MPR_c+A\text{-}MPR_c+T_{B,c}, P\text{-}MPR_c)-T_{C,c}\};\quad\text{Equation 3:}$$

$$P_{CMAX\_H,c}=\text{MIN}\{P_{EMAX,c}, P_{PowerClass}\};\quad\text{Equation 4:}$$

Where $P_{EMAX,c}$ represents allowable maximum power configured by the network side for the respective component carrier, $P_{PowerClass}$ represents a UE power level, related to a band in which the UE transmits, without taking into account any power reduction, P-MPR (Power Management Maximum Power Reduction) represents a predefined maximum power reduction, $T_{C,c}$=1.5 dB or 0 represents a sideband transmit power reduction corresponding to the respective component carrier; $MPR_c$ (Maximum Power Reduction) and $A\text{-}MPR_c$ (Additional-Maximum Power Reduction) represent power reductions, corresponding to the respective component carrier, related to a transmit bandwidth, a modulation order, particular Resource Block (RB) allocation, etc.; and $T_{IB,c}$ represents an additional sideband reduction; and In the case of intra-band CA, both $MPR_c$ and $A\text{-}MPR_c$ are the same for each component carrier and are determined according to the sum of transmit bandwidths of uplink channels and uplink signals concurrently transmitted on the respective aggregated component carriers, and if there are a plurality of modulation modes, then the modulation mode at the highest order may apply. In the case of inter-band CA, if the respective aggregated component carriers lie in different separate bands, and the power reduction parameter of the respective component carrier is determined only according to the sum of transmit bandwidths of an uplink channel and an uplink signal concurrently transmitted on the component carrier, then $MPR_c$ of the respective component carriers may be different from each other, and also $A\text{-}MPR_c$ of the respective component carriers may be different from each other, and if there are a plurality of modulation modes, then the modulation mode at the highest order may apply.

Unlike the LTE system, the following several characteristics are supported in the LTE-A system: a Physical Uplink Shared Channel (PUSCH) is transmitted on a component carrier by allocating inconsecutive resources; both a PUSCH and a Physical Uplink Control Channel (PUCCH) are transmitted concurrently on the PCC; both a PUSCH and a PUCCH on different component carriers are transmitted concurrently; and PUSCHs on different component carriers are transmitted concurrently.

Power Headroom (PH) reported by the UE is primarily used by the eNB to determine remaining power of the UE to thereby schedule reasonably the PUSCH to be transmitted in a larger number of Physical Resource Blocks (PRBs) without being limited in power. Thus power reduction conditions of the respective component carriers may be different from each other due to the transmission characteristics above in the LTE-A system, so PHs corresponding to respective component carriers need to be reported so that the eNB schedules more reasonably uplink transmission on the component carriers. Moreover the PHs should not only reflect a power headroom when the PUSCH is transmitted, but also reflect a power headroom when both the PUCCH and the PUSCH are transmitted, so the following two PH report types are defined in the LTE-A Rel-10 system:

Firstly the Type 1 PH primarily reflects the power headroom when the PUSCH is transmitted, which will be reported for each component carrier.

Secondly the Type 2 PH primarily reflects the power headroom when both the PUCCH and the PUSCH are transmitted, which will be reported only for the PCC.

There are three duplex modes supported in the LTE system: the Frequency Division Duplex (FDD) mode as illustrated in FIG. 3A, the Half-Frequency Division Duplex (H-FDD) mode as illustrated in FIG. 3B, and the Time Division Duplex (TDD) mode as illustrated in FIG. 3C. Here the FDD refers to that uplink transmission and downlink transmission are performed in different carrier frequency bands so that both the base station and the user equipment can receive a signal and transmit a signal concurrently. To this end, the FDD devices need to be provided with two sets of transceivers and duplex filters. The H-FDD differs from the FDD in that the user equipment cannot transmit a signal and receive a signal concurrently, that is, the base station in the H-FDD is the same as the base station in the FDD, but the user equipment in the H-FDD can be simplified relative to the user equipment in the FDD by maintaining only one of the sets of transceivers and saving a cost of the duplexer. The TDD refers to that uplink transmission and downlink transmission are performed in the same carrier frequency band to enable transmission (reception) or reception (transmission) of a channel by the base station (user equipment) respectively in different periods of time.

It is very likely to support carrier aggregation of an FDD carrier and a TDD carrier in evolved systems subsequent to the LTE-A system, and at this time the UE may support transmission of the PUCCHs on different uplink carriers corresponding to different sets of carriers, and both the PUCCH and the PUSCH may be transmitted on a plurality of uplink carriers, but there has been absent so far a corresponding PH report solution in this scenario.

SUMMARY

Embodiments of the invention provide a method and device for reporting power headrooms under carrier aggregation so as to address the problem of how to report PHs when a user equipment supports transmission of PUCCHs on different uplink carriers corresponding to different sets of carriers.

There is a method for reporting PHs under carrier aggregation, wherein a plurality of downlink carriers are aggregated for a user equipment, and the plurality of carriers are grouped into a plurality of sets of carriers; for each of the sets of carriers, an uplink carrier linked to specified one of the downlink carriers in the set of carriers is specified as an uplink carrier, on which a PUCCH can be transmitted, corresponding to the set of carriers; and the method includes:

generating, by the user equipment, a Type 1 PH and a Type 2 PH for each of a plurality of uplink carriers, on which PUCCHs can be transmitted, for which PHs need to be reported; and generating a Type 1 PH for each of uplink carriers, for which PHs need to be reported, other than the uplink carriers on which PUCCHs can be transmitted; and reporting, by the user equipment, the generated respective Type 1 PH and Type 2 PH to the network side in a current uplink sub-frame.

In the solution according to the embodiment of the invention, when the user equipment supports transmission of PUCCHs on different uplink carriers corresponding to different sets of carriers, this solution proposes a particular implementation of the method for reporting PHs by a user equipment to thereby address the problem of how to report PHs when the user equipment supports transmission of PUCCHs on different uplink carriers corresponding to different sets of carriers.

Preferably before generating, by the user equipment, the Type 1 PH and the Type 2 PH for each of the plurality of uplink carriers, on which PUCCHs can be transmitted, for which PHs need to be reported, the method further includes:

grouping, by the user equipment, the plurality of downlink carriers aggregated for the user equipment into the plurality of sets of carriers according to configuration information transmitted by the network side, wherein each of the sets of carriers includes at least one of the downlink carriers; and for each of the sets of carriers, determining, by the user equipment, the uplink carrier linked to specified one of the downlink carriers in the set of carrier as the uplink carrier, on which a PUCCH can be transmitted, corresponding to the set of carriers according to higher-layer signaling transmitted by the network side or as predefined with the network side.

Further to any one of the embodiments above of the method, preferably generating, by the user equipment, the Type 1 PH and/or the Type 2 PH can include: for each of the uplink carriers on which PUCCHs can be transmitted and the uplink carriers other than the uplink carriers on which PUCCHs can be transmitted, generating, by the user equipment, the Type 1 PH of the uplink carrier according to uplink transmission related information of uplink carriers linked to the respective downlink carriers in the set of carriers corresponding to the uplink carrier; and for each of the uplink carriers on which PUCCHs can be transmitted, generating, by the user equipment, the Type 2 PH of the uplink carrier according to the uplink transmission related information of the uplink carriers linked to the respective downlink carriers in the set of carriers corresponding to the uplink carrier; wherein the set of carriers corresponding to the uplink carrier refers to the set of carriers to which the downlink carrier linked to the uplink carrier belongs.

Preferably for each of the uplink carriers on which PUCCHs can be transmitted and the uplink carriers other than the uplink carriers on which PUCCHs can be transmitted, generating, by the user equipment, the Type 1 PH of the uplink carrier according to the uplink transmission related information of the uplink carriers linked to the respective downlink carriers in the set of carriers corresponding to the uplink carrier includes:

if the user equipment transmits a PUSCH on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i, then generating the Type 1 PH of the uplink carrier in accordance with Equation 1 below;

if the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, then generating the Type 1 PH of the uplink carrier in accordance with Equation 2 below;

if the user equipment does not transmit a PUSCH on the uplink carrier in the current uplink sub-frame i, then generating the Type 1 PH of the uplink carrier in accordance with Equation 3 below;

or if the user equipment transmits a PUSCH but no PUCCH on the uplink carrier in the current uplink sub-frame i, then generating the Type 1 PH of the uplink carrier in accordance with Equation 1 below;

if the user equipment transmits both a PUSCH and a PUCCH on the uplink carrier in the current uplink sub-frame i, then generating the Type 1 PH of the uplink carrier in accordance with Equation 2 below;

if the user equipment does not transmit a PUSCH on the uplink carrier in the current uplink sub-frame i, then generating the Type 1 PH of the uplink carrier in accordance with Equation 3 below.

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}; \quad \text{Equation 1}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}; \quad \text{Equation 2}$$

wherein c represents the carrier index of the uplink carrier; $\tilde{P}_{CMAX,c}(i)$ represents maximum transmit power of the user equipment on the uplink carrier c in the current uplink sub-frame i, wherein suppose only PUSCHs are transmitted on the uplink carriers linked to the respective downlink carriers in the set of carriers corresponding to the uplink carrier c in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers, other than the uplink carrier c, linked to the respective downlink carriers in the set of carriers corresponding to the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{P_{O\_PUSCH,c}(1) + \alpha_c(1) \cdot PL_c + f_c\} \text{ [dB]}; \quad \text{Equation 3}$$

wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of Maximum Power Reduction, MPR is 0, the value of Additional-Maximum Power Reduction, A-MPR, is 0 dB, the value of Power Management Maximum Power Reduction, P-MPR is 0, and the value of sideband transmit power reduction $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c.

Preferably for each of the uplink carriers on which PUCCHs can be transmitted, generating, by the user equipment, the Type 2 PH of the uplink carrier according to the uplink transmission related information of the uplink carriers linked to the respective downlink carriers in the set of carriers corresponding to the uplink carrier includes:

if the user equipment transmits both a PUCCH and a PUSCH on the uplink carrier in the current uplink sub-frame i, then generating the Type 2 PH of the uplink carrier in accordance with Equation 4 below;

if the user equipment transmits a PUSCH but no PUCCH on the uplink carrier in the current uplink sub-frame i, then generating the Type 2 PH of the uplink carrier in accordance with Equation 5 below;

if the user equipment transmits a PUCCH but no PUSCH on the uplink carrier in the current uplink sub-frame i, then generating the Type 2 PH of the uplink carrier in accordance with Equation 6 below;

if the user equipment transmits neither PUSCH nor PUCCH on the uplink carrier in the current uplink sub-frame i, then generating the Type 2 PH of the uplink carrier in accordance with Equation 7 below;

$$PH_{type2,c}(i) = P_{CMAX,c}(i) - 10\log_{10}\left(\begin{array}{c} 10^{(10\log_{10}(M_{PUSCH,c}(i)) + P_{O\_PUSCH,c}(j) + \alpha_c(j) \cdot PL_c + \Delta_{TF,c}(i) + f_c(i))/10} + \\ 10^{(P_{0\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10} \end{array}\right) \text{ [dB]}; \quad \text{Equation 4}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(\begin{array}{c} 10^{(10\log_{10}(M_{PUSCH,c}(i)) + P_{O\_PUSCH,c}(j) + \alpha_c(j) \cdot PL_c + \Delta_{TF,c}(i) + f_c(i))/10} + \\ 10^{(P_{0\_PUCCH,c} + PL_c + g_c(i))/10} \end{array}\right) \text{ [dB]}; \quad \text{Equation 5}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10} \quad \text{Equation 6}$$
$$\left( \begin{array}{l} 10^{(P_{O\_PUSCH,c}(1)+\alpha_c(1)\cdot PL_c + f_c(i))/10} + \\ 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10} \end{array} \right)$$
[dB];

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent predefined parameters for calculating power of the PUCCH transmitted in the current uplink sub-frame i on the uplink carrier c; and $P_{O\_PUCCH,c}(1)$, $\alpha_c(1)$, $PL_c$ and $f_c(i)$ represent predefined parameters for calculating power of virtual PUSCH transmission in the current uplink sub-frame i on the uplink carrier c;

$$PH_{type2,c}(i) = \tilde{P}_{CMAX,c}(i) - \quad \text{Equation 7}$$
$$10\log_{10}\left( \begin{array}{l} 10^{(P_{O\_PUSCH,c}(1)+\alpha_c(1)\cdot PL_c + f_c(i))/10} + \\ 10^{(P_{O\_PUCCH,c}+PL_c+g_c(i))/10} \end{array} \right) [dB];$$

wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0 dB, the value of P-MPR is 0, and the value of $\Delta T_C$ is 0; $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c; and $P_{O\_PUCCH,c}$, $PL_c$ and $g_c(i)$ represent predefined parameters for calculating power of virtual PUCCH transmission in the current uplink sub-frame i on the uplink carrier c.

Further to any one of the embodiments above of the method, preferably for each of the uplink carriers on which PUCCHs can be transmitted and the uplink carriers other than the uplink carriers on which PUCCHs can be transmitted, the user equipment generates the Type 1 PH of the uplink carrier according to the uplink transmission related information of all the uplink carriers; and for each of the uplink carriers on which PUCCHs can be transmitted, the user equipment generates the Type 2 PH of the uplink carrier according to the uplink transmission related information of all the uplink carriers.

Preferably for each of the uplink carriers on which PUCCHs can be transmitted and the uplink carriers other than the uplink carriers on which PUCCHs can be transmitted, generating, by the user equipment, the Type 1 PH of the uplink carrier according to the uplink transmission related information of all the uplink carriers includes:

if the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, then generating the Type 1 PH of the uplink carrier in accordance with Equation 8 below;

if the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, then generating the Type 1 PH of the uplink carrier in accordance with Equation 9 below;

if the user equipment does not transmit a PUSCH on the uplink carrier in the current uplink sub-frame i, then generating the Type 1 PH of the uplink carrier in accordance with Equation 10 below;

or if the user equipment transmits a PUSCH but no PUCCH on the uplink carrier in the current uplink sub-frame i, then generating the Type 1 PH of the uplink carrier in accordance with Equation 8 below;

if the user equipment transmits both a PUSCH and a PUCCH on the uplink carrier in the current uplink sub-frame i, then generating the Type 1 PH of the uplink carrier in accordance with Equation 9 below;

if the user equipment does not transmit a PUSCH on the uplink carrier in the current uplink sub-frame i, then generating the Type 1 PH of the uplink carrier in accordance with Equation 10 below;

$$PH_{type1,c}(i) = P_{CMAX,c}(i) - \{10\log_{10}(M_{PUSCH,c}(i)) + P_{O\_PUSCH,c}(j) + \alpha_c(j)\cdot PL_c + \Delta_{TF,c}(i) + f_c(i)\} \text{ [dB]}; \quad \text{Equation 8:}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10\log_{10}(M_{PUSCH,c}(i)) + P_{O\_PUSCH,c}(j) + \alpha_c(j)\cdot PL_c + \Delta_{TF,c}(i) + f_c(i)\} \text{ [dB]}; \quad \text{Equation 9:}$$

wherein c represents the carrier index of the uplink carrier; $\tilde{P}_{CMAX,c}(i)$ represents maximum transmit power of the user equipment on the uplink carrier c in the current uplink sub-frame i, wherein suppose only PUSCHs are transmitted on all the uplink carriers in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers of the user equipment other than the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{P_{O\_PUSCH,c}(1) + \alpha_c(1)\cdot PL_c + f_c(i)\} \text{ [dB]}; \quad \text{Equation 10:}$$

wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0 dB, the value of P-MPR is 0, and the value of $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c.

Preferably for each of the uplink carriers on which PUCCHs can be transmitted, generating, by the user equipment, the Type 2 PH of the uplink carrier according to the uplink transmission related information of all the uplink carriers includes:

if the user equipment transmits both a PUCCH and a PUSCH on the uplink carrier in the current uplink sub-frame i, then generating the Type 2 PH of the uplink carrier in accordance with Equation 11 below;

if the user equipment transmits a PUSCH but no PUCCH on the uplink carrier in the current uplink sub-frame i, then generating the Type 2 PH of the uplink carrier in accordance with Equation 12 below;

if the user equipment transmits a PUCCH but no PUSCH on the uplink carrier in the current uplink sub-frame i, then generating the Type 2 PH of the uplink carrier in accordance with Equation 13 below;

if the user equipment transmits neither PUCCH nor PUSCH on the uplink carrier in the current uplink sub-frame i, then generating the Type 2 PH of the uplink carrier in accordance with Equation 14 below;

Equation 11
$$PH_{type2,c}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10}\right)$$ [dB];

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

Equation 12
$$PH_{type2,c}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH,c} + PL_c + g_c(i))/10}\right)$$ [dB];

wherein c represents the carrier index of the uplink carrier; P er; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

Equation 13
$$PH_{type2,c}(i) = P_{CMAX,c}(i) - 10\log_{10}\left(10^{(P_{O\_PUSCH,c}(1) + \alpha_c(1) \cdot PL_c + f_c(i))/10} + 10^{(P_{0\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10}\right)$$ [dB];

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c;

Equation 14
$$PH_{type2,c}(i) = \tilde{P}_{CMAX,c}(i) - 10\log_{10}\left(10^{(P_{O\_PUSCH,c}(1) + \alpha_c(1) \cdot PL_c + f_c(i))/10} + 10^{(P_{0\_PUCCH,c} + PL_c + g_c(i))/10}\right)$$ [dB];

wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0 dB, the value of P-MPR is 0, and the value of $\Delta T_C$ is 0; $P_{O\_PUSCH,c}(1)$, $\alpha_c(1)$, $PL_c$ and $f_c(i)$ represent predefined parameters for calculating power of virtual PUSCH transmission in the current uplink carrier i on the uplink carrier c; and $P_{O\_PUCCH,c}$, $PL_c$ and $g_c(i)$ represent predefined parameters for calculating power of virtual PUCCH transmission in the current uplink carrier i on the uplink carrier c.

Preferably wherein when the user equipment generates the Type 1 PH of the uplink carrier in accordance with Equation 2, the method further includes:

reporting, by a physical layer of the user equipment, $\tilde{P}_{CMAX,c}(i)$ to a higher layer of the user equipment.

Preferably wherein when the user equipment generates the Type 1 PH of the uplink carrier in accordance with Equation 9, the method further includes:

reporting, by a physical layer of the user equipment, $\tilde{P}_{CMAX,c}(i)$ to a higher layer of the user equipment.

Preferably the power reductions include the MPR and the A-MPR; and the uplink transmission related information includes one or a combination of uplink transmission bandwidth, modulation order, and Resource Block, RB, allocation information.

A method for reporting Power Headrooms, PHs, under carrier aggregation includes:

receiving, by the network side, PH information reported by a user equipment for which a plurality of downlink carriers are aggregated, wherein the plurality of carriers are grouped into a plurality of sets of carriers; and for each of the sets of carriers, an uplink carrier linked to specified one of the downlink carriers in the set of carriers is specified as an uplink carrier, on which a PUCCH can be transmitted, corresponding to the set of carriers; and obtaining, by the network side, from the PH information a Type 1 PH and a Type 2 PH corresponding respectively to each of a plurality of uplink carriers, on which PUCCHs can be transmitted, for which PHs need to be reported; and obtaining, by the network side, from the PH information a Type 1 PH corresponding respectively to each of uplink carriers, for which PHs need to be reported, other than the uplink carriers on which PUCCHs can be transmitted.

In the solution according to the embodiment of the invention, the user equipment generates a Type 1 PH and a Type 2 PH for each of a plurality of uplink carriers, on which PUCCHs can be transmitted, for which PHs need to be reported; generates a Type 1 PH for each of uplink carriers, for which PHs need to be reported, other than the uplink carriers on which PUCCHs can be transmitted; and reports the generated respective Type 1 PH and Type 2 PH to the network side in a current uplink sub-frame. As can be apparent, when the user equipment supports transmission of PUCCHs on different uplink carriers corresponding to different sets of carriers, this solution proposes a particular implementation of the method for reporting PHs by a user equipment to thereby address the problem of how to report PHs when the user equipment supports transmission of PUCCHs on different uplink carriers corresponding to different sets of carriers.

Preferably before the network side receives the PH information reported by the user equipment, the method further includes:

transmitting, by the network side, configuration information to the user equipment to instruct the user equipment to group the plurality of aggregated downlink carriers into the plurality of sets of carriers, wherein each of the sets of carriers includes at least one of the downlink carriers; and transmitting, by the network side, higher-layer signaling to the user equipment to indicate for each of the sets of carriers the uplink carrier linked to specified one of the downlink carriers in the set of carriers as the uplink carrier, on which a PUCCH can be transmitted, corresponding to the set of carriers; or determining, by the network side, for each of the sets of carriers the uplink carrier linked to specified one of the downlink carriers in the set of carriers as the uplink carrier, on which a PUCCH can be transmitted, corresponding to the set of carriers as predefined with the user equipment.

Further to any one of the embodiments above of the method, preferably for each of the uplink carriers on which PUCCHs can be transmitted and the uplink carriers other than the uplink carriers on which PUCCHs can be transmitted, the network side determines that the Type 1 PH corresponding to the uplink carrier is generated by the user equipment according to uplink transmission related information of uplink carriers linked to the respective downlink carriers in the set of carriers corresponding to the uplink carrier; and for each of the uplink carriers on which PUCCHs can be transmitted, the network side determines that the Type 2 PH corresponding to the uplink carrier is generated by the user equipment according to the uplink transmission related information of the uplink carriers linked to the respective downlink carriers in the set of carriers corresponding to the uplink carrier.

Preferably for each of the uplink carriers on which PUCCHs can be transmitted and the uplink carriers other than the uplink carriers on which PUCCHs can be transmitted, determining, by the network side, that the Type 1 PH corresponding to the uplink carrier is generated by the user equipment according to the uplink transmission related information of the uplink carriers linked to the respective downlink carriers in the set of carriers corresponding to the uplink carrier includes:

if the network side determines that the user equipment transmits a PUSCH on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i, then determining, by the network side, that the user equipment generates the Type 1 PH of the uplink carrier in accordance with Equation 1 below;

if the network side determines that the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, then determining, by the network side, that the user equipment generates the Type 1 PH of the uplink carrier in accordance with Equation 2 below;

if the network side determines that the user equipment does not transmit a PUSCH on the uplink carrier in the current uplink sub-frame i, then determining, by the network side, that the user equipment generates the Type 1 PH of the uplink carrier in accordance with Equation 3 below;

or if the network side determines that the user equipment transmits a PUSCH but no PUCCH on the uplink carrier in the current uplink sub-frame i, then determining, by the network side, that the user equipment generates the Type 1 PH of the uplink carrier in accordance with Equation 1 below;

if the network side determines that the user equipment transmits both a PUSCH and a PUCCH on the uplink carrier in the current uplink sub-frame i, then determining, by the network side, that the user equipment generates the Type 1 PH of the uplink carrier in accordance with Equation 2 below;

if the network side determines that the user equipment does not transmit a PUSCH on the uplink carrier in the current uplink sub-frame i, then determining, by the network side, that the user equipment generates the Type 1 PH of the uplink carrier in accordance with Equation 3 below.

Preferably for each of the uplink carriers on which PUCCHs can be transmitted, determining, by the network side, that the Type 2 PH corresponding to the uplink carrier is generated by the user equipment according to the uplink transmission related information of the uplink carriers linked to the respective downlink carriers in the set of carriers corresponding to the uplink carrier includes:

if the network side determines that the user equipment transmits both a PUCCH and a PUSCH on the uplink carrier in the current uplink sub-frame i, then determining, by the network side, that the user equipment generates the Type 2 PH of the uplink carrier in accordance with Equation 4 below;

if the network side determines that the user equipment transmits a PUSCH but no PUCCH on the uplink carrier in the current uplink sub-frame i, then determining, by the network side, that the user equipment generates the Type 2 PH of the uplink carrier in accordance with Equation 5 below;

if the network side determines that the user equipment transmits a PUCCH but no PUSCH on the uplink carrier in the current uplink sub-frame i, then determining, by the network side, that the user equipment generates the Type 2 PH of the uplink carrier in accordance with Equation 6 below;

if the network side determines that the user equipment transmits neither PUSCH nor PUCCH on the uplink carrier in the current uplink sub-frame i, then determining, by the network side, that the user equipment generates the Type 2 PH of the uplink carrier in accordance with Equation 7 below.

Further to any one of the embodiments above of the method, preferably for each of the uplink carriers on which PUCCHs can be transmitted and the uplink carriers other than the uplink carriers on which PUCCHs can be transmitted, the network side determines that the Type 1 PH corresponding to the uplink carrier is generated by the user equipment according to uplink transmission related information of all the uplink carriers; and for each of the uplink carriers on which PUCCHs can be transmitted, the network side determines that the Type 2 PH corresponding to the uplink carrier is generated by the user equipment according to the uplink transmission related information of all the uplink carriers.

Preferably for each of the uplink carriers on which PUCCHs can be transmitted and the uplink carriers other than the uplink carriers on which PUCCHs can be transmitted, determining, by the network side, that the Type 1 PH corresponding to the uplink carrier is generated by the user equipment according to the uplink transmission related information of all the uplink carriers includes:

if the network side determines that the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, then determining, by the network side, that the user equipment generates the Type 1 PH of the uplink carrier in accordance with Equation 8 below;

if the network side determines that the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, then determining, by the network side, that the user equipment generates the Type 1 PH of the uplink carrier in accordance with Equation 9 below;

if the network side determines that the user equipment does not transmit a PUSCH on the uplink carrier in the current uplink sub-frame i, then determining, by the network side, that the user equipment generates the Type 1 PH of the uplink carrier in accordance with Equation 10 below;

or if the network side determines that the user equipment transmits a PUSCH but no PUCCH on the uplink carrier in the current uplink sub-frame i, then determining, by the network side, that the user equipment generates the Type 1 PH of the uplink carrier in accordance with Equation 8 below;

if the network side determines that the user equipment transmits both a PUSCH and a PUCCH on the uplink carrier in the current uplink sub-frame i, then determining, by the network side, that the user equipment generates the Type 1 PH of the uplink carrier in accordance with Equation 9 below;

if the network side determines that the user equipment does not transmit a PUSCH on the uplink carrier in the current uplink sub-frame i, then determining, by the network side, that the user equipment generates the Type 1 PH of the uplink carrier in accordance with Equation 10 below.

Preferably for each of the uplink carriers on which PUCCHs can be transmitted, determining, by the network side, that the Type 2 PH corresponding to the uplink carrier is generated by the user equipment according to the uplink transmission related information of all the uplink carriers includes:

if the network side determines that the user equipment transmits both a PUCCH and a PUSCH on the uplink carrier in the current uplink sub-frame i, then determining, by the network side, that the user equipment generates the Type 2 PH of the uplink carrier in accordance with Equation 11 below;

if the network side determines that the user equipment transmits a PUSCH but no PUCCH on the uplink carrier in the current uplink sub-frame i, then determining, by the network side, that the user equipment generates the Type 2 PH of the uplink carrier in accordance with Equation 12 below;

if the network side determines that the user equipment transmits a PUCCH but no PUSCH on the uplink carrier in the current uplink sub-frame i, then determining, by the network side, that the user equipment generates the Type 2 PH of the uplink carrier in accordance with Equation 13 below;

if the network side determines that the user equipment transmits neither PUCCH nor PUSCH on the uplink carrier in the current uplink sub-frame i, then determining, by the network side, that the user equipment generates the Type 2 PH of the uplink carrier in accordance with Equation 14 below.

Preferably the power reductions include the MPR and the A-MPR; and the uplink transmission related information includes one or a combination of uplink transmission bandwidth, modulation order, and Resource Block, RB, allocation information.

There is a user equipment, wherein a plurality of downlink carriers are aggregated for the user equipment, the plurality of downlink carriers are grouped into a plurality of sets of carriers, and for each set of carriers, an uplink carrier linked to specified one of the downlink carriers in the set of carriers is specified as an uplink carrier, on which a PUCCH can be transmitted, corresponding to the set of carriers; and the user equipment includes:

a PH generating unit configured to generate a Type 1 PH and a Type 2 PH for each of a plurality of uplink carriers, on which PUCCHs can be transmitted, for which PHs need to be reported; and to generate a Type 1 PH for each of uplink carriers, for which PHs need to be reported, other than the uplink carriers on which PUCCHs can be transmitted; and a PH reporting unit configured to report the generated respective Type 1 PH and Type 2 PH to the network side in a current uplink sub-frame.

In the solution according to the embodiment of the invention, the user equipment generates a Type 1 PH and a Type 2 PH for each of a plurality of uplink carriers, on which PUCCHs can be transmitted, for which PHs need to be reported; generates a Type 1 PH for each of uplink carriers, for which PHs need to be reported, other than the uplink carriers on which PUCCHs can be transmitted; and reports the generated respective Type 1 PH and Type 2 PH to the network side in a current uplink sub-frame. As can be apparent, when the user equipment supports transmission of PUCCHs on different uplink carriers corresponding to different sets of carriers, this solution proposes a particular implementation of the method for reporting PHs by a user equipment to thereby address the problem of how to report PHs when the user equipment supports transmission of PUCCHs on different uplink carriers corresponding to different sets of carriers.

Preferably the user equipment further includes:

a configuring unit configured, before the Type 1 PH and the Type 2 PH are generated for each of a plurality of uplink carriers, on which PUCCHs can be transmitted, for which PHs need to be reported, to group the plurality of downlink carriers aggregated for the user equipment into the plurality of sets of carriers according to configuration information transmitted by the network side, wherein each of the sets of carriers includes at least one of the downlink carriers; and for each of the sets of carriers, to determine the uplink carrier linked to specified one of the downlink carriers in the set of carrier as the uplink carrier, on which a PUCCH can be transmitted, corresponding to the set of carriers according to higher-layer signaling transmitted by the network side or as predefined with the network side.

Further to any one of the embodiments above of the user equipment, preferably the PH generating unit includes:

a first generating unit configured, for each of the uplink carriers on which PUCCHs can be transmitted and the uplink carriers other than the uplink carriers on which PUCCHs can be transmitted, to generate the Type 1 PH of the uplink carrier according to uplink transmission related information of uplink carriers linked to the respective downlink carriers in the set of carriers corresponding to the uplink carrier; and a second generating unit configured, for each of the uplink carriers on which PUCCHs can be transmitted, to generate the Type 2 PH of the uplink carrier according to the uplink transmission related information of the uplink carriers linked to the respective downlink carriers in the set of carriers corresponding to the uplink carrier;

wherein the set of carriers corresponding to the uplink carrier refers to the set of carriers to which the downlink carrier linked to the uplink carrier belongs.

Preferably the first generating unit is configured:

if the user equipment transmits a PUSCH on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i, to generate the Type 1 PH of the uplink carrier in accordance with Equation 1 below;

if the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, to generate the Type 1 PH of the uplink carrier in accordance with Equation 2 below;

if the user equipment does not transmit a PUSCH on the uplink carrier in the current uplink sub-frame i, to generate the Type 1 PH of the uplink carrier in accordance with Equation 3 below;

or if the user equipment transmits a PUSCH but no PUCCH on the uplink carrier in the current uplink sub-frame i, to generate the Type 1 PH of the uplink carrier in accordance with Equation 1 below;

if the user equipment transmits both a PUSCH and a PUCCH on the uplink carrier in the current uplink sub-frame i, to generate the Type 1 PH of the uplink carrier in accordance with Equation 2 below;

if the user equipment does not transmit a PUSCH on the uplink carrier in the current uplink sub-frame i, to generate the Type 1 PH of the uplink carrier in accordance with Equation 3 below.

Preferably the second generating unit is configured:

if the user equipment transmits both a PUCCH and a PUSCH on the uplink carrier in the current uplink sub-frame i, to generate the Type 2 PH of the uplink carrier in accordance with Equation 4 below;

if the user equipment transmits a PUSCH but no PUCCH on the uplink carrier in the current uplink sub-frame i, to generate the Type 2 PH of the uplink carrier in accordance with Equation 5 below;

if the user equipment transmits a PUCCH but no PUSCH on the uplink carrier in the current uplink sub-frame i, to generate the Type 2 PH of the uplink carrier in accordance with Equation 6 below;

if the user equipment transmits neither PUSCH nor PUCCH on the uplink carrier in the current uplink sub-frame i, to generate the Type 2 PH of the uplink carrier in accordance with Equation 7 below.

Further to any one of the embodiments above of the user equipment, preferably the PH generating unit includes:

a third generating unit configured for each of the uplink carriers on which PUCCHs can be transmitted and the uplink carriers other than the uplink carriers on which PUCCHs can be transmitted, to generate the Type 1 PH of the uplink carrier according to uplink transmission related information of all the uplink carriers; and a fourth generating unit configured, for each of the uplink carriers on which PUCCHs can be transmitted, to generate the Type 2 PH of the uplink carrier according to the uplink transmission related information of all the uplink carriers.

Preferably the third generating unit is configured:

if the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, to generate the Type 1 PH of the uplink carrier in accordance with Equation 8 below;

if the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, to generate the Type 1 PH of the uplink carrier in accordance with Equation 9 below;

if the user equipment does not transmit a PUSCH on the uplink carrier in the current uplink sub-frame i, to generate the Type 1 PH of the uplink carrier in accordance with Equation 10 below;

or if the user equipment transmits a PUSCH but no PUCCH on the uplink carrier in the current uplink sub-frame i, to generate the Type 1 PH of the uplink carrier in accordance with Equation 8 below;

if the user equipment transmits both a PUSCH and a PUCCH on the uplink carrier in the current uplink sub-frame i, to generate the Type 1 PH of the uplink carrier in accordance with Equation 9 below;

if the user equipment does not transmit a PUSCH on the uplink carrier in the current uplink sub-frame i, to generate the Type 1 PH of the uplink carrier in accordance with Equation 10 below.

Preferably the fourth generating unit is configured:

if the user equipment transmits both a PUCCH and a PUSCH on the uplink carrier in the current uplink sub-frame i, to generate the Type 2 PH of the uplink carrier in accordance with Equation 11 below;

if the user equipment transmits a PUSCH but no PUCCH on the uplink carrier in the current uplink sub-frame i, to generate the Type 2 PH of the uplink carrier in accordance with Equation 12 below;

if the user equipment transmits a PUCCH but no PUSCH on the uplink carrier in the current uplink sub-frame i, to generate the Type 2 PH of the uplink carrier in accordance with Equation 13 below;

if the user equipment transmits neither PUCCH nor PUSCH on the uplink carrier in the current uplink sub-frame i, to generate the Type 2 PH of the uplink carrier in accordance with Equation 14 below, Preferably the first generating unit is further configured to report $\tilde{P}_{CMAX,c}(i)$ to a higher layer of the user equipment when the Type 1 PH of the uplink carrier is generated in accordance with Equation 2.

Preferably the third generating unit is further configured to report $\tilde{P}_{CMAX,c}(i)$ to a higher layer of the user equipment when the Type 1 PH of the uplink carrier is generated in accordance with Equation 9.

Preferably the power reductions include the MPR and the A-MPR; and the uplink transmission related information includes one or a combination of uplink transmission bandwidth, modulation order, and Resource Block, RB, allocation information.

Based upon the same inventive idea as the method, an embodiment of the invention further provides a user equipment for which a plurality of downlink carriers are aggregated, wherein the plurality of downlink carriers are grouped into a plurality of sets of carriers, and for each set of carriers, an uplink carrier linked to specified one of the downlink carriers in the set of carriers is specified as an uplink carrier, on which a Physical Uplink Control Channel, PUCCH, is transmitted, corresponding to the set of carriers. The user equipment includes a processor and a radio frequency unit, wherein:

the processor is configured to generate a Type 1 PH and a Type 2 PH for each of a plurality of uplink carriers, on which PUCCHs can be transmitted, for which PHs need to be reported; and to generate a Type 1 PH for each of uplink carriers, for which PHs need to be reported, other than the uplink carriers on which PUCCHs can be transmitted; and the radio frequency unit is configured to report the generated respective Type 1 PH and Type 2 PH to the network side in a current uplink sub-frame.

In the solution according to the embodiment of the invention, the user equipment generates a Type 1 PH and a Type 2 PH for each of a plurality of uplink carriers, on which PUCCHs can be transmitted, for which PHs need to be reported; generates a Type 1 PH for each of uplink carriers, for which PHs need to be reported, other than the uplink carriers on which PUCCHs can be transmitted; and reports the generated respective Type 1 PH and Type 2 PH to the network side in a current uplink sub-frame. As can be apparent, when the user equipment supports transmission of PUCCHs on different uplink carriers corresponding to different sets of carriers, this solution proposes a particular implementation of the method for reporting PHs by a user equipment to thereby address the problem of how to report PHs when the user equipment supports transmission of PUCCHs on different uplink carriers corresponding to different sets of carriers.

A base station includes:

a PH receiving unit configured to receive Power Headroom, PH, information reported by a user equipment for which a plurality of downlink carriers are aggregated, wherein the plurality of carriers are grouped into a plurality of sets of carriers; and for each of the sets of carriers, an uplink carrier linked to specified one of the downlink carriers in the set of carriers is specified as an uplink carrier, on which a PUCCH can be transmitted, corresponding to the set of carriers; and a PH obtaining unit configured to obtain from the PH information a Type 1 PH and a Type 2 PH corresponding respectively to each of a plurality of uplink carriers, on which PUCCHs can be transmitted, for which PHs need to be reported; and to obtain from the PH information a Type 1 PH corresponding respectively to each of uplink carriers, for which PHs need to be reported, other than the uplink carriers on which PUCCHs can be transmitted.

In the solution according to the embodiment of the invention, the user equipment generates a Type 1 PH and a Type 2 PH for each of a plurality of uplink carriers, on which PUCCHs can be transmitted, for which PHs need to be reported; generates a Type 1 PH for each of uplink carriers, for which PHs need to be reported, other than the uplink carriers on which PUCCHs can be transmitted; and reports the generated respective Type 1 PH and Type 2 PH to the network side in a current uplink sub-frame. As can be apparent, when the user equipment supports transmission of PUCCHs on different uplink carriers corresponding to different sets of carriers, this solution proposes a particular implementation of the method for reporting PHs by a user equipment to thereby address the problem of how to report PHs when the user equipment supports transmission of PUCCHs on different uplink carriers corresponding to different sets of carriers.

Preferably the base station further includes:

a configuring unit configured to transmit configuration information to the user equipment to instruct the user equipment to group the plurality of aggregated downlink carriers into the plurality of sets of carriers, before the PH information reported by the user equipment is received, wherein each of the sets of carriers includes at least one of the downlink carriers; and to transmit higher-layer signaling to the user equipment to indicate for each of the sets of carriers the uplink carrier linked to specified one of the downlink carriers in the set of carriers as the uplink carrier, on which a PUCCH can be transmitted, corresponding to the set of carriers; or to determine for each of the sets of carriers the uplink carrier linked to specified one of the downlink carriers in the set of carriers as the uplink carrier, on which a PUCCH can be transmitted, corresponding to the set of carriers as predefined with the user equipment.

Further to any one of the embodiments above of the user equipment, preferably the PH obtaining unit is further configured:

for each of the uplink carriers on which PUCCHs can be transmitted and the uplink carriers other than the uplink carriers on which PUCCHs can be transmitted, to determine that the Type 1 PH corresponding to the uplink carrier is generated by the user equipment according to uplink transmission related information of uplink carriers linked to the respective downlink carriers in the set of carriers corresponding to the uplink carrier; and for each of the uplink carriers on which PUCCHs can be transmitted, to determine that the Type 2 PH of the uplink carrier is generated by the user equipment according to the uplink transmission related information of the uplink carriers linked to the respective downlink carriers in the set of carriers corresponding to the uplink carrier.

Preferably the PH obtaining unit is configured:

if it is determined that the user equipment transmits a PUSCH on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i, to determine that the user equipment generates the Type 1 PH of the uplink carrier in accordance with Equation 1 below;

if it is determined that the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, to determine that the user equipment generates the Type 1 PH of the uplink carrier in accordance with Equation 2 below;

if it is determined that the user equipment does not transmit a PUSCH on the uplink carrier in the current uplink sub-frame i, to determine that the user equipment generates the Type 1 PH of the uplink carrier in accordance with Equation 3 below;

or if it is determined that the user equipment transmits a PUSCH but no PUCCH on the uplink carrier in the current uplink sub-frame i, to determine that the user equipment generates the Type 1 PH of the uplink carrier in accordance with Equation 1 below;

if it is determined that the user equipment transmits both a PUSCH and a PUCCH on the uplink carrier in the current uplink sub-frame i, to determine that the user equipment generates the Type 1 PH of the uplink carrier in accordance with Equation 2 below;

if it is determined that the user equipment does not transmit a PUSCH on the uplink carrier in the current uplink sub-frame i, to determine that the user equipment generates the Type 1 PH of the uplink carrier in accordance with Equation 3 below.

Preferably the PH obtaining unit configured:

if it is determined that the user equipment transmits both a PUCCH and a PUSCH on the uplink carrier in the current uplink sub-frame i, to determine that the user equipment generates the Type 2 PH of the uplink carrier in accordance with Equation 4 below;

if it is determined that the user equipment transmits a PUSCH but no PUCCH on the uplink carrier in the current uplink sub-frame i, to determine that the user equipment generates the Type 2 PH of the uplink carrier in accordance with Equation 5 below;

if it is determined that the user equipment transmits a PUCCH but no PUSCH on the uplink carrier in the current uplink sub-frame i, to determine that the user equipment generates the Type 2 PH of the uplink carrier in accordance with Equation 6 below;

if it is determined that the user equipment transmits neither PUSCH nor PUCCH on the uplink carrier in the current uplink sub-frame i, to determine that the user equipment generates the Type 2 PH of the uplink carrier in accordance with Equation 7 below.

Further to any one of the embodiments above of the user equipment, preferably the PH obtaining unit is further configured:

for each of the uplink carriers on which PUCCHs can be transmitted and the uplink carriers other than the uplink carriers on which PUCCHs can be transmitted, to determine that the Type 1 PH corresponding to the uplink carrier is generated by the user equipment according to uplink transmission related information of all the uplink carriers; and for each of the uplink carriers on which PUCCHs can be transmitted, to determine that the Type 2 PH corresponding to the uplink carrier is generated by the user equipment according to the uplink transmission related information of all the uplink carriers.

Preferably the PH obtaining unit is configured:

if it is determined that the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, to determine that the user equipment generates the Type 1 PH of the uplink carrier in accordance with Equation 8 below;

if it is determined that the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, to determine that the user equipment generates the Type 1 PH of the uplink carrier in accordance with Equation 9 below;

if it is determined that the user equipment does not transmit a PUSCH on the uplink carrier in the current uplink sub-frame i, to determine that the user equipment generates the Type 1 PH of the uplink carrier in accordance with Equation 10 below;

or if it is determined that the user equipment transmits a PUSCH but no PUCCH on the uplink carrier in the current uplink sub-frame i, to determine that the user equipment generates the Type 1 PH of the uplink carrier in accordance with Equation 8 below;

if it is determined that the user equipment transmits both a PUSCH and a PUCCH on the uplink carrier in the current uplink sub-frame i, to determine that the user equipment generates the Type 1 PH of the uplink carrier in accordance with Equation 9 below;

if it is determined that the user equipment does not transmit a PUSCH on the uplink carrier in the current uplink sub-frame i, to determine that the user equipment generates the Type 1 PH of the uplink carrier in accordance with Equation 10 below.

Preferably the PH obtaining unit is configured:

if it is determined that the user equipment transmits both a PUCCH and a PUSCH on the uplink carrier in the current uplink sub-frame i, to determine that the user equipment generates the Type 2 PH of the uplink carrier in accordance with Equation 11 below;

if it is determined that the user equipment transmits a PUSCH but no PUCCH on the uplink carrier in the current uplink sub-frame i, to determine that the user equipment generates the Type 2 PH of the uplink carrier in accordance with Equation 12 below;

if it is determined that the user equipment transmits a PUCCH but no PUSCH on the uplink carrier in the current uplink sub-frame i, to determine that the user equipment generates the Type 2 PH of the uplink carrier in accordance with Equation 13 below;

if it is determined that the user equipment transmits neither PUCCH nor PUSCH on the uplink carrier in the current uplink sub-frame i, to determine that the user equipment generates the Type 2 PH of the uplink carrier in accordance with Equation 14 below.

Preferably the power reductions include the MPR and the A-MPR; and the uplink transmission related information includes one or a combination of uplink transmission bandwidth, modulation order, and Resource Block, RB, allocation information.

Based upon the same inventive idea as the method, an embodiment of the invention further provides a base station including a radio frequency unit and a processor, wherein:

the radio frequency unit is configured to receive Power Headroom, PH, information reported by a user equipment for which a plurality of downlink carriers are aggregated, where the plurality of carriers are grouped into a plurality of sets of carriers; and for each of the sets of carriers, an uplink carrier linked to specified one of the downlink carriers in the set of carriers is specified as an uplink carrier, on which a PUCCH can be transmitted, corresponding to the set of carriers; and the processor is configured to obtain from the PH information a Type 1 PH and a Type 2 PH corresponding respectively to each of a plurality of uplink carriers, on which PUCCHs can be transmitted, for which PHs need to be reported; and to obtain from the PH information a Type 1 PH corresponding respectively to each of uplink carriers, for which PHs need to be reported, other than the uplink carriers on which PUCCHs can be transmitted.

In the solution according to the embodiment of the invention, the user equipment generates a Type 1 PH and a Type 2 PH for each of a plurality of uplink carriers, on which PUCCHs can be transmitted, for which PHs need to be reported; generates a Type 1 PH for each of uplink carriers, for which PHs need to be reported, other than the uplink carriers on which PUCCHs can be transmitted; and reports the generated respective Type 1 PH and Type 2 PH to the network side in a current uplink sub-frame. As can be apparent, when the user equipment supports transmission of PUCCHs on different uplink carriers corresponding to different sets of carriers, this solution proposes a particular implementation of the method for reporting PHs by a user equipment to thereby address the problem of how to report PHs when the user equipment supports transmission of PUCCHs on different uplink carriers corresponding to different sets of carriers.

BRIEF DESCRIPTION OF THE DRAWINGS

FIG. 4 illustrates a schematic diagram of carrier groups according to an embodiment of the invention;

FIG. 5 illustrates a schematic flow chart of a method according to an embodiment of the invention;

DETAILED DESCRIPTION OF THE EMBODIMENTS

Figure 1:
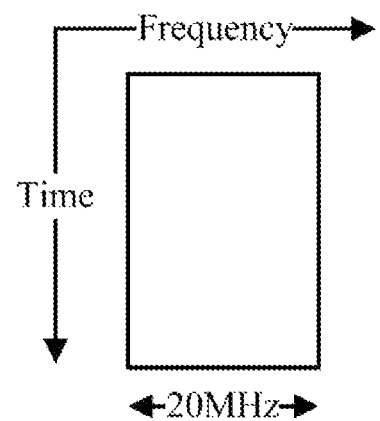
FIG. 1 illustrates a schematic diagram of carrier distribution in the LTE cell in the prior art.
Figure 2:
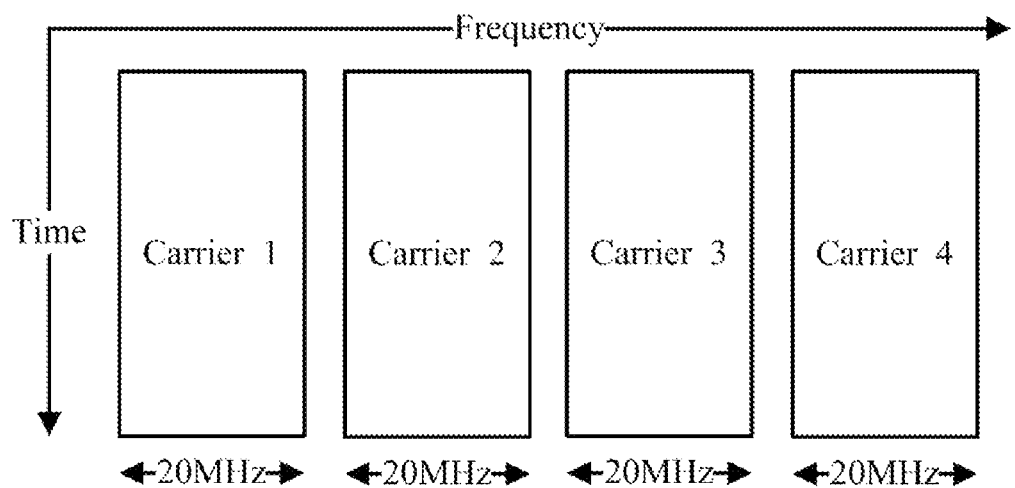
FIG. 2 illustrates a schematic diagram of carrier aggregation in the LTE-A system in the prior art.
Figure 3A:
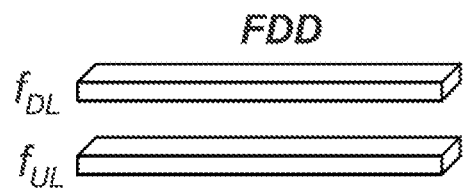
FIG. 3A illustrates a schematic diagram of the FDD in the prior art.
Figure 3B:
FIG. 3B illustrates a schematic diagram of the H-FDD in the prior art.
Figure 3C:
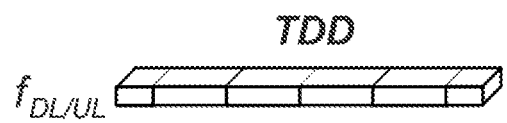
FIG. 3C illustrates a schematic diagram of the TDD in the prior art.

When an FDD carrier and a TDD carrier are aggregated, since the FDD carrier and the TDD carrier operate in different modes, a new uplink transmission scheme may be introduced as illustrated in FIG. 4 where:

A plurality of downlink carriers are aggregated for a user equipment, and each of the downlink carriers is linked to an uplink carrier; and the aggregated downlink carriers (the respective downlink carriers in FIG. 4 are represented as C) are grouped into N sets $S_i$ of carriers, where a downlink carrier belongs to only one set of carriers, and the carriers in the same set of carriers operate in the same duplex mode. The same TDD uplink/downlink configuration is applied to all the TDD carriers in a set of carrier, where N represents an integer more than 1.

For each set $S_i$ of carriers, an uplink carrier $C_{UL,i}$ linked to specified one of the downlink carriers in the set of carriers is specified as an uplink carrier, on which a Physical Uplink Control Channel (PUCCH) is transmitted, corresponding to the set of carriers; the same duplex mode as the set of carriers is applied to the uplink carrier, on which a PUCCH can be transmitted, corresponding to the set of carriers; and if the current set of carriers include a TDD carrier, then the same TDD uplink/downlink configuration as the corresponding set of carriers is applied to the uplink carrier. Different sets of carriers correspond to different uplink carriers on which PUCCHs can be transmitted.

Positive acknowledgement/negative acknowledgement (ACK/NACK) information corresponding to downlink data received by the UE on the set of carriers is transmitted through a PUCCH on the uplink carrier, on which a PUCCH can be transmitted, corresponding to the set of carriers, that is, the UE can transmit PUCCHs respectively on a plurality of uplink carriers.

The linkage of the downlink carrier with the uplink carrier is configured by the network side for the UE through system information SIB-1, where a downlink carrier is linked to one uplink carrier; and since the UE is notified of the linkage typically in the SIB-1 message, it is also referred to as an SIB-1 linkage; and typically a downlink carrier has only one uplink carrier linked thereto or has no uplink carrier linked thereto. For the FDD, different frequency resources are applied to the uplink carrier and the downlink carrier respectively, and typically the downlink carrier and the uplink carrier are always configured to be linked, and at this time the carrier aggregation is referred to as uplink-downlink symmetric carrier aggregation; or of course there may alternatively be an FDD downlink carrier without any uplink carrier linked thereto (referred to as a DL only carrier), and at this time the carrier aggregation is referred to as uplink-downlink asymmetric carrier aggregation. For the TDD, the same frequency resource is common to the uplink carrier and the downlink carrier, and uplink and downlink transmission is distinguished by different transmission periods of time in which the same carrier acts respectively as an uplink carrier and a downlink carrier. Thus when grouping downlink carriers, an uplink carrier linked to a downlink carrier shall also belongs to the same set of carriers as the downlink carrier on principle.

From the perspective of the concept of aggregation of serving cells, there are one uplink carrier and one downlink carrier in each of the serving cells aggregated for the UE, and for the FDD, the uplink carrier and the downlink carrier in the serving cell are carriers at different frequencies; and for the TDD, the uplink carrier and the downlink carrier in the serving cell are carriers at the same frequency. Each of the serving cells can include both one uplink carrier and one downlink carrier, or can include only one downlink carrier, which can be known from the SIB-1 information. For example, if serving cells 1, 2 and 3 each include one uplink carrier and one downlink carrier, and a serving cell 4 includes only one downlink carrier, then the serving cells are grouped so that if the serving cells 1 and 2 are grouped together (or the downlink carrier 1 and the downlink carrier 2 are grouped together), then the set of downlink carriers actually includes two uplink carriers and two downlink carriers, where the two uplink downlink carriers are uplink carriers linked respectively to the two downlink carriers; and if the serving cells 3 and 4 are grouped together (or the downlink carriers 3 and 4 are grouped together), then the set of downlink carriers actually includes one uplink downlink carrier and two downlink carriers, where one of the downlink carriers has no uplink carrier linked thereto.

In order to address the problem of how to report PHs when a UE supports transmission of PUCCHs on different uplink carriers corresponding to different sets of carriers, the embodiments of the invention provide the following method for reporting PHs under carrier aggregation.

Referring to FIG. 5, a method for reporting PHs under carrier aggregation according to an embodiment of the invention includes the following operations:

Operation 50: A user equipment generates a Type 1 PH and a Type 2 PH for each of a plurality of uplink carriers, on which PUCCHs can be transmitted, for which PHs need to be reported; and generates a Type 1 PH for each of uplink carriers, for which PHs need to be reported, other than the uplink carriers on which PUCCHs can be transmitted; and Operation 51: The user equipment reports the generated respective Type 1 PH and Type 2 PH to the network side in a current uplink sub-frame.

Furthermore the user equipment can group downlink carriers before the operation 50 as follows: the user equipment groups a plurality of downlink carriers aggregated for the user equipment into a plurality of sets of carriers according to configuration information transmitted by the network side, where each of the sets of carriers includes at least one of the downlink carriers; and The user equipment determines for each of the sets of carriers an uplink carrier linked to specified one of the downlink carriers in the set of carrier as an uplink carrier, on which a PUCCH can be transmitted, corresponding to the set of carriers, according to higher-layer signaling transmitted by the network side or as predefined with the network side.

In an implementation, the operation 50 can be performed particularly as follows: for each of the uplink carriers, on which PUCCHs can be transmitted, for which PHs need to be reported, and the uplink carriers, for which PHs need to be reported, other than the uplink carriers on which PUCCHs can be transmitted, the user equipment generates the Type 1 PH of the uplink carrier according to uplink transmission related information of uplink carriers linked to the respective downlink carriers in the set of carriers corresponding to the uplink carrier; and For each of the uplink carriers, on which PUCCHs can be transmitted, for which PHs need to be reported, the user equipment generates the Type 2 PH of the uplink carrier according to the uplink transmission related information of the uplink carriers linked to the respective downlink carriers in the set of carriers corresponding to the uplink carrier.

Here the set of carriers corresponding to the uplink carrier refers to the set of carriers to which the downlink carrier linked to the uplink carrier belongs.

Particularly for each of the uplink carriers on which PUCCHs can be transmitted and the uplink carriers other than the uplink carriers on which PUCCHs can be transmitted, the user equipment can generate the Type 1 PH of the uplink carrier according to the uplink transmission related information of the uplink carriers linked to the respective downlink carriers in the set of carriers corresponding to the uplink carrier particularly as follows:

If the user equipment transmits a Physical Uplink Shared Channel (PUSCH) on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i (since a PUCCH can only be transmitted on one of uplink carriers linked to respective downlink carriers in a set of carriers, this description is equivalent to that the user equipment does not transmit a PUCCH on an uplink carrier, on which a PUCCH can be transmitted, corresponding to the set of carrier corresponding to the uplink carrier, which will hold true throughout the following description if applicable), then the user equipment generates the Type 1 PH of the uplink carrier in accordance with Equation 1 below;

If the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, then the user equipment generates the Type 1 PH of the uplink carrier in accordance with Equation 2 below; and If the user equipment does not transmit a PUSCH on the uplink carrier in the current uplink sub-frame i, then the user equipment generates the Type 1 PH of the uplink carrier in accordance with Equation 3 below.

Particularly for each of the uplink carriers on which PUCCHs can be transmitted and the uplink carriers other than the uplink carriers on which PUCCHs can be transmitted, the user equipment can alternatively generate the Type 1 PH of the uplink carrier according to the uplink transmission related information of the uplink carriers linked to the respective downlink carriers in the set of carriers corresponding to the uplink carrier particularly as follows:

If the user equipment transmits a PUSCH but no PUCCH on the uplink carrier in the current uplink sub-frame i, then the user equipment generates the Type 1 PH of the uplink carrier in accordance with Equation 1 below;

If the user equipment transmits both a PUSCH and a PUCCH on the uplink carrier in the current uplink sub-frame i, then the user equipment generates the Type 1 PH of the uplink carrier in accordance with Equation 2 below; and If the user equipment does not transmit a PUSCH on the uplink carrier in the current uplink sub-frame i, then the user equipment generates the Type 1 PH of the uplink carrier in accordance with Equation 3 below;

$$PH_{type1,c}(i)=P_{CMAX,c}(i)-\{10 \log_{10}(M_{PUSCH,c}(i))+ P_{O\_PUSCH,c}(j)+\alpha_c(j)\cdot PL_c+\Delta_{TF,c}(i)+f_c(i)\} \text{ [dB]};$$ Equation 1:

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c (i.e., the uplink transmission related information corresponding to the real uplink transmission (e.g., PUCCH transmission, PUSCH transmission, SRS transmission, etc.), in the current uplink sub-fame i, on the respective uplink carriers linked to the respective downlink carriers in the set of carriers without taking into account corresponding uplink transmission in the other sets of carriers); and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c, for details of which reference can be made to the description in the LTE-A communication protocol;

$$PH_{type1,c}(i)=\tilde{P}_{CMAX,c}(i)-\{10 \log_{10}(M_{PUSCH,c}(i))+ P_{O\_PUSCH,c}(j)+\alpha_c(j)\cdot PL_c+\Delta_{TF,c}(i)+f_c(i)\} \text{ [dB]};$$ Equation 2:

Where c represents the carrier index of the uplink carrier; $\tilde{P}_{CMAX,c}(i)$ represents maximum transmit power of the user equipment on the uplink carrier c in the current uplink sub-frame i, where suppose only PUSCHs are transmitted on the uplink carriers linked to the respective downlink carriers in the set of carriers corresponding to the uplink carrier c in the current uplink sub-frame i, then power reductions for determining $\tilde{P}_{CMAX,c}(i)$ are determined according to the uplink transmission related information corresponding to the PUSCHs (that is, regardless of whether PUCCHs are transmitted on the respective uplink carriers linked to the respective downlink carriers in the set of carriers, it is supposed that only PUSCHs are transmitted on these uplink carriers in the current uplink sub-frame i, without taking into account corresponding uplink transmission in the other sets of carriers), or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers, other than the uplink carrier c, linked to the respective downlink carriers in the set of carriers corresponding to the uplink carrier c (that is, suppose there is no PUCCH transmitted on the current uplink carrier, and there is uplink transmission (e.g., PUSCHs, SRSs etc.,) on the uplink carriers, other than the uplink carrier c, linked to the respective downlink carriers in the set of carriers corresponding to the uplink carrier c, then the uplink transmission related information of the uplink transmission will be taken into account); and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c, for details of which reference can be made to the description in the LTE-A communication protocol; and $$PH_{type1,c}(i)=\tilde{P}_{CMAX,c}(i)-\{P_{O\_PUSCH,c}(1)+\alpha_c(1)\cdot PL_c+ f_c\} \text{ [dB]};$$ Equation 3:

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of Maximum Power Reduction (MPR) is 0, the value of Additional-Maximum Power Reduction (A-MPR) is 0 dB, the Power Management Maximum Power Reduction (P-MPR) is 0, and the value of sideband transmit power reduction $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c, for details of which reference can be made to the description in the LTE-A communication protocol.

It shall be further noted that in each of the three scenarios above, whether there are PUCCHs transmitted in the other sets of carriers will not be taken into account, that is, regardless of whether there are PUCCHs transmitted on uplink carriers, on which PUCCHs can be transmitted, corresponding to the other sets of carriers, the user equipment generates the Type 1 PH of the uplink carrier in accordance with corresponding Equation 1 or Equation 2 or Equation 3 as long as the corresponding conditions above are satisfied.

Particularly for each of the uplink carriers on which PUCCHs can be transmitted, the user equipment can generate the Type 2 PH of the uplink carrier according to the uplink transmission related information of uplink carriers linked to the respective downlink carriers in the set of carriers corresponding to the uplink carrier particularly as follows:

If the user equipment transmits both a PUCCH and a PUSCH on the uplink carrier in the current uplink sub-frame i, then the user equipment generates the Type 2 PH of the uplink carrier in accordance with Equation 4 below;

If the user equipment transmits a PUSCH but no PUCCH on the uplink carrier in the current uplink sub-frame i, then the user equipment generates the Type 2 PH of the uplink carrier in accordance with Equation 5 below;

If the user equipment transmits a PUCCH but no PUSCH on the uplink carrier in the current uplink sub-frame i, then the user equipment generates the Type 2 PH of the uplink carrier in accordance with Equation 6 below; and If the user equipment transmits neither PUSCH nor PUCCH on the uplink carrier in the current uplink sub-frame i, then the user equipment generates the Type 2 PH of the uplink carrier in accordance with Equation 7 below;

Equation 4

$$PH_{type2,c}(i) = P_{CMAX,c}(i) - 10\log_{10} \left( \begin{array}{l} 10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH,c}+PL_c+h_c(n_{CQI},n_{HARQ},n_{SR})+\Delta_{F\_PUCCH,c}(F)+\Delta_{TxD,c}(F')+g_c(i))/10} \end{array} \right)$$

[dB];

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c (i.e., the uplink transmission related information corresponding to the real uplink transmission (e.g., PUCCHs, PUSCHs, SRSs, etc.), in the current uplink sub-fame i, on the respective uplink carriers linked to the respective downlink carriers in the set of carriers without taking into account corresponding uplink transmission in the other sets of carriers); $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c, for details of which reference can be made to the description in the LTE-A communication protocol; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c, for details of which reference can be made to the description in the LTE-A communication protocol;

$$PH_{type2,c}(i) = P_{CMAX,c}(i) - 10\log_{10} \qquad \text{Equation 5}$$

$$\left( 10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH,c} + PL_c + g_c(i))/10} \right)[dB];$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$ and $g_c(i)$ represent predefined parameters for calculating power of virtual PUCCH transmission in the current uplink sub-frame i on the uplink carrier c, for details of which reference can be made to the description in the LTE-A communication protocol; and $M_{PUSCH,c}(i)$, $P_{O\_PUSCH,c}(i)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c, for details of which reference can be made to the description in the LTE-A communication protocol;

$$PH_{type2,c}(i) = P_{CMAX,c}(i) - 10\log_{10} \qquad \text{Equation 6}$$

$$\left( 10^{(P_{O\_PUSCH,c}(1) + \alpha_c(1) \cdot PL_c + f_c(i))/10} + 10^{(P_{0\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10} \right)[dB];$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent predefined parameters for calculating power of the PUCCH transmitted in the current uplink sub-frame i on the uplink carrier c, for details of which reference can be made to the description in the LTE-A communication protocol; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c, for details of which reference can be made to the description in the LTE-A communication protocol; and $$PH_{type2,c}(i) = \tilde{P}_{CMAX,c}(i) - \qquad \text{Equation 7}$$

$$10\log_{10}\left( 10^{(P_{O\_PUSCH,c}(1) + \alpha_c(1) \cdot PL_c + f_c(i))/10} + 10^{(P_{0\_PUCCH,c} + PL_c + g_c(i))/10} \right)[dB];$$

Where c represents the carrier index of the uplink carrier; $\tilde{P}_{CMAX,c}(i)$ represents maximum transmit power of the user equipment on the uplink carrier c in the current uplink sub frame i, where $\tilde{P}_{CMAX,c}(i)$ is determined assuming that the value of MPR is 0, the value of A-MPR is 0 dB, the value of P-MPR is 0, and the value of $\Delta T_C$ is 0; $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c, for details of which reference can be made to the description in the LTE-A communication protocol; and $P_{O\_PUCCH,c}$, $PL_c$ and $g_c(i)$ represent predefined parameters for calculating power of virtual PUCCH transmission in the current uplink sub-frame i on the uplink carrier c, for details of which reference can be made to the description in the LTE-A communication protocol.

In each of the four scenarios above, whether there are PUCCHs transmitted in the other sets of carriers will not be taken into account, that is, regardless of whether there are PUCCHs transmitted on uplink carriers, on which PUCCHs can be transmitted, corresponding to the other sets of carriers, the user equipment generates the Type 2 PH of the uplink carrier in accordance with corresponding Equation 4 or Equation 5 or Equation 6 or Equation 7 as long as the corresponding conditions above are satisfied, where the power reductions are calculated without taking into account uplink transmission related information of uplink carriers linked to the respective downlink carriers in the other sets of carriers.

In another implementation, the operation 50 can be performed particularly as follows: for each of the uplink carriers on which PUCCHs can be transmitted and the uplink carriers other than the uplink carriers on which PUCCHs can be transmitted, the user equipment generates the Type 1 PH of the uplink carrier according to uplink transmission related information of all the uplink carriers; and For each of the uplink carriers on which PUCCHs can be transmitted, the user equipment generates the Type 2 PH of the uplink carrier according to the uplink transmission related information of all the uplink carriers.

Particularly for each of the uplink carriers on which PUCCHs can be transmitted and the uplink carriers other than the uplink carriers on which PUCCHs can be transmitted, the user equipment can generate the Type 1 PH of the uplink carrier according to the uplink transmission related information of all the uplink carriers particularly as follows:

If the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, then the user equipment generates the Type 1 PH of the uplink carrier in accordance with Equation 8 below;

If the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, then the user equipment generates the Type 1 PH of the uplink carrier in accordance with Equation 9 below; and If the user equipment does not transmit a PUSCH on the uplink carrier in the current uplink sub-frame i, then the user equipment generates the Type 1 PH of the uplink carrier in accordance with Equation 10 below; or Particularly for each of the uplink carriers on which PUCCHs can be transmitted and the uplink carriers other than the uplink carriers on which PUCCHs can be transmitted, the user equipment can alternatively generate the Type 1 PH of the uplink carrier according to the uplink transmission related information of all the uplink carriers particularly as follows:

If the user equipment transmits a PUSCH but no PUCCH on the uplink carrier in the current uplink sub-frame i, then the user equipment generates the Type 1 PH of the uplink carrier in accordance with Equation 8 below;

If the user equipment transmits both a PUSCH and a PUCCH on the uplink carrier in the current uplink sub-frame i, then the user equipment generates the Type 1 PH of the uplink carrier in accordance with Equation 9 below; and If the user equipment does not transmit a PUSCH on the uplink carrier in the current uplink sub-frame i, then the user equipment generates the Type 1 PH of the uplink carrier in accordance with Equation 10 below;

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB];} \quad \text{Equation 8:}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c, for details of which reference can be made to the description in the LTE-A communication protocol;

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB];} \quad \text{Equation 9:}$$

Where c represents the carrier index of the uplink carrier; $\tilde{P}_{CMAX,c}(i)$ represents maximum transmit power of the user equipment on the uplink carrier c in the current uplink sub-frame i, where suppose only PUSCHs are transmitted on all the uplink carriers in the current uplink sub-frame i, then power reductions for determining $\tilde{P}_{CMAX,c}(i)$ are determined according to the uplink transmission related information corresponding to the PUSCHs (that is, suppose there is no PUCCH transmitted on an uplink carrier, on which a PUCCH can be transmitted, corresponding to any one of the sets of carriers of the user equipment, and only the uplink transmission related information corresponding to real PUSCHs on all the uplink carriers is taken into account), or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers of the user equipment other than the uplink carrier c (that is, if the user equipment does not transmit a PUCCH on the uplink carrier, and there are PUCCHs transmitted on uplink carriers, on which PUCCHs can be transmitted, corresponding to the other sets of carriers, then the uplink transmission related information corresponding to the PUCCHs will also be taken into account, that is, the uplink transmission related information corresponding to uplink channels, e.g., PUCCHs/PUSCHs/SRSs, on the uplink carriers other than the current uplink carrier will be taken into account); and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c, for details of which reference can be made to the description in the LTE-A communication protocol; and $$PH_{type1,c}(i) = \tilde{P}_{CMAX,c}(i) - \{P_{O\_PUSCH,c}(1) + \alpha_c(1) \cdot PL_c + f_c(i)\} \text{ [dB];} \quad \text{Equation 10:}$$

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c, for details of which reference can be made to the description in the LTE-A communication protocol.

It shall be further noted that in each of the three scenarios above, whether PUCCHs are transmitted in the respective sets of carriers will be taken into account, that is, if there is a PUCCH transmitted on an uplink carrier, on which a PUCCH can be transmitted, corresponding to any one of the sets of carriers, then the user equipment determines that there is a PUCCH transmitted in the uplink sub-frame i, and generates the Type 1 PH of the uplink carrier in accordance with corresponding Equation 8 or Equation 9 or Equation 10 when the corresponding conditions are satisfied.

Particularly for each of the uplink carriers on which PUCCHs can be transmitted, the user equipment can generate the Type 2 PH of the uplink carrier according to the uplink transmission related information of all the uplink carriers particularly as follows:

If the user equipment transmits both a PUCCH and a PUSCH on the uplink carrier in the current uplink sub-frame i, then the user equipment generates the Type 2 PH of the uplink carrier in accordance with Equation 11 below;

If the user equipment transmits a PUSCH but no PUCCH on the uplink carrier in the current uplink sub-frame i, then the user equipment generates the Type 2 PH of the uplink carrier in accordance with Equation 12 below;

If the user equipment transmits a PUCCH but no PUSCH on the uplink carrier in the current uplink sub-frame i, then the user equipment generates the Type 2 PH of the uplink carrier in accordance with Equation 13 below; and If the user equipment transmits neither PUCCH nor PUSCH on the uplink carrier in the current uplink sub-frame i, then the user equipment generates the Type 2 PH of the uplink carrier in accordance with Equation 14 below;

Equation 11

$$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right)$$

[dB];

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c, for details of which reference can be made to the description in the LTE-A communication protocol; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c, for details of which reference can be made to the description in the LTE-A communication protocol;

Equation 12

$$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH,c}+PL_c+g_c(i))/10}\end{array}\right)$$[dB];

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c, for details of which reference can be made to the description in the LTE-A communication protocol;

Equation 13

$$PH_{type2,c}(i) = P_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right)$$

[dB];

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent predefined parameters for calculating power of the PUCCH transmitted in the current uplink sub-frame i on the uplink carrier c; and $P_{O\_PUSCH,c}(1)$, $\alpha_c(1)$, $PL_c$ and $f_c(i)$ represent parameters for calculating power of virtual PUSCH transmission in the current uplink sub-frame i on the uplink carrier c, for details of which reference can be made to the description in the LTE-A communication protocol; and Equation 14

$$PH_{type2,c}(i) = \tilde{P}_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{O\_PUCCH,c}+PL_c+g_c(i))/10}\end{array}\right)[dB];$$

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; $P_{O\_PUSCH,c}(1)$, $\alpha_c(1)$, $PL_c$ and $f_c(i)$ represent predefined parameters for calculating power of virtual PUSCH transmission in the current uplink carrier i on the uplink carrier c; and $P_{O\_PUCCH,c}$, $PL_c$ and $g_c(i)$ represent predefined parameters for calculating power of virtual PUCCH transmission in the current uplink carrier i on the uplink carrier c, for details of which reference can be made to the description in the LTE-A communication protocol.

Furthermore when the user equipment generates the Type 1 PH of the uplink carrier in accordance with Equation 2 or Equation 9, the physical layer of the user equipment can report $\tilde{P}_{CMAX,c}(i)$ to a higher layer of the user equipment.

In this method, the power reductions include but will not be limited to the MPR and the A-MPR; and the uplink transmission related information includes one or a combination of uplink transmission bandwidth, modulation order, and Resource Block (RB) allocation information. In the invention, reference can be made to the description in the LTE-A communication protocol 36.101 for determination of the power reductions according to the uplink transmission related information, and determination of $P_{CMAX,c}(i)$ or $\tilde{P}_{CMAX,c}(i)$ according to the power reductions.

Figure 6:
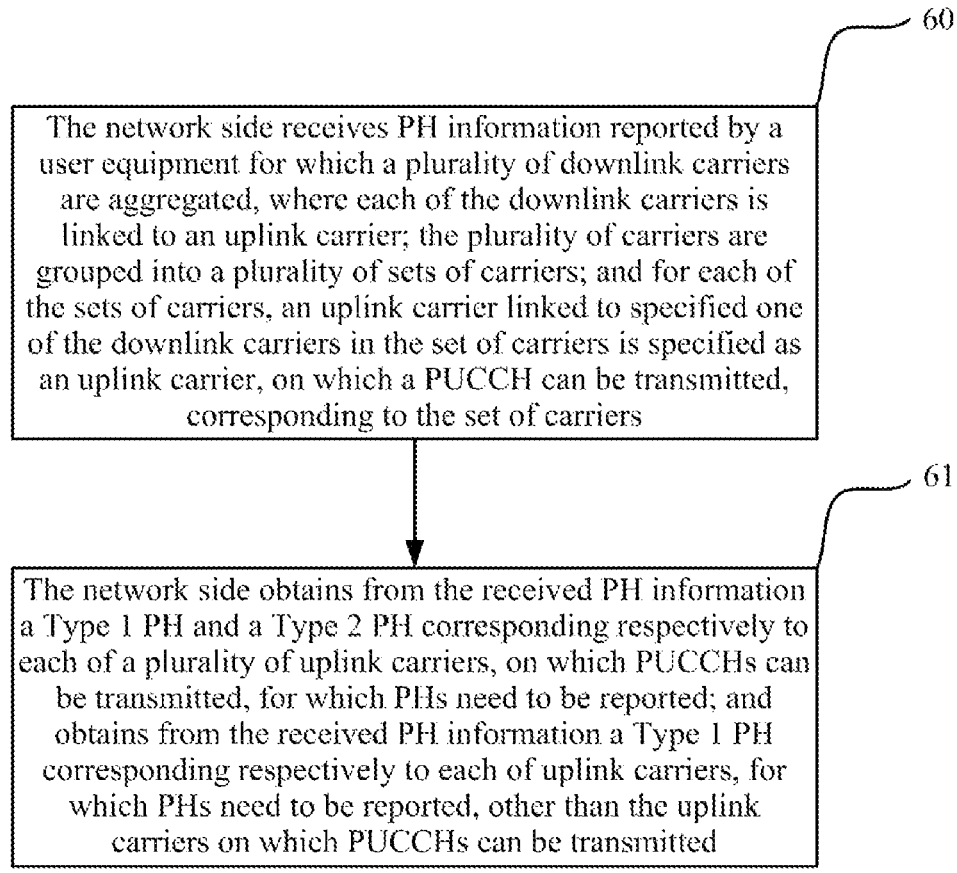
FIG. 6 illustrates a schematic flow chart of another method according to an embodiment of the invention.

Referring to FIG. 6, an embodiment of the invention provides a method for receiving PHs under carrier aggregation, which includes the following operations:

Operation 60: The network side receives PH information reported by a user equipment for which a plurality of downlink carriers are aggregated, where the plurality of carriers are grouped into a plurality of sets of carriers; and for each of the sets of carriers, an uplink carrier linked to specified one of the downlink carriers in the set of carriers is specified as an uplink carrier, on which a PUCCH can be transmitted, corresponding to the set of carriers; and Operation 61: The network side obtains from the received PH information a Type 1 PH and a Type 2 PH corresponding respectively to each of a plurality of uplink carriers, on which PUCCHs can be transmitted, for which PHs need to be reported; and the network side obtains from the received PH information a Type 1 PH corresponding respectively to each of uplink carriers, for which PHs need to be reported, other than the uplink carriers on which PUCCHs can be transmitted.

Furthermore before the network side receives the PH information reported by the user equipment, the network side can transmit configuration information to the user equipment to instruct the user equipment to group the plurality of aggregated downlink carriers into the plurality of sets of carriers, where each of the sets of carriers includes at least one of the downlink carriers; and The network side transmits higher-layer signaling to the user equipment to indicate for each of the sets of carriers the uplink carrier linked to specified one of the downlink carriers in the set of carriers as the uplink carrier, on which a PUCCH can be transmitted, corresponding to the set of carriers; or the network side determines for each of the sets of carriers the uplink carrier linked to specified one of the downlink carriers in the set of carriers as the uplink carrier, on which a PUCCH can be transmitted, corresponding to the set of carriers as predefined with the user equipment.

In an implementation, after the operation 61, for each of the uplink carriers on which PUCCHs can be transmitted and the uplink carriers other than the uplink carriers on which PUCCHs can be transmitted, the network side determines that the Type 1 PH corresponding to the uplink carrier is generated by the user equipment according to uplink transmission related information of uplink carriers linked to the respective downlink carriers in the set of carriers corresponding to the uplink carrier; and For each of the uplink carriers on which PUCCHs can be transmitted, the network side determines that the Type 2 PH corresponding to the uplink carrier is generated by the user equipment according to the uplink transmission related information of the uplink carriers linked to the respective downlink carriers in the set of carriers corresponding to the uplink carrier.

Particularly for each of the uplink carriers on which PUCCHs can be transmitted and the uplink carriers other than the uplink carriers on which PUCCHs can be transmitted, the network side can determine that the Type 1 PH corresponding to the uplink carrier is generated by the user equipment according to the uplink transmission related information of the uplink carriers linked to the respective downlink carriers in the set of carriers corresponding to the uplink carrier particularly as follows:

If the network side determines that the user equipment transmits a PUSCH on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i, then the network side determines that the user equipment generates the Type 1 PH of the uplink carrier in accordance with Equation 1 below;

If the network side determines that the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, then the network side determines that the user equipment generates the Type 1 PH of the uplink carrier in accordance with Equation 2 below; and If the network side determines that the user equipment does not transmit a PUSCH on the uplink carrier in the current uplink sub-frame i, then the network side determines that the user equipment generates the Type 1 PH of the uplink carrier in accordance with Equation 3 below.

Particularly for each of the uplink carriers on which PUCCHs can be transmitted and the uplink carriers other than the uplink carriers on which PUCCHs can be transmitted, the network side can alternatively determines that the Type 1 PH corresponding to the uplink carrier is generated by the user equipment according to the uplink transmission related information of the uplink carriers linked to the respective downlink carriers in the set of carriers corresponding to the uplink carrier particularly as follows:

If the network side determines that the user equipment transmits a PUSCH but no PUCCH on the uplink carrier in the current uplink sub-frame i, then the network side determines that the user equipment generates the Type 1 PH of the uplink carrier in accordance with Equation 1 below;

If the network side determines that the user equipment transmits both a PUSCH and a PUCCH on the uplink carrier in the current uplink sub-frame i, then the network side determines that the user equipment generates the Type 1 PH of the uplink carrier in accordance with Equation 2 below; and If the network side determines that the user equipment does not transmit a PUSCH on the uplink carrier in the current uplink sub-frame i, then the network side determines that the user equipment generates the Type 1 PH of the uplink carrier in accordance with Equation 3 below;

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]};$$ Equation 1:

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]};$$ Equation 2:

Where c represents the carrier index of the uplink carrier; $\tilde{P}_{CMAX,c}(i)$ represents maximum transmit power of the user equipment on the uplink carrier c in the current uplink sub-frame i, where suppose only PUSCHs are transmitted on the uplink carriers linked to the respective downlink carriers in the set of carriers corresponding to the uplink carrier c in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers, other than the uplink carrier c, linked to the respective downlink carriers in the set of carriers corresponding to the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c; and $$PH_{type1,c}(i) = \tilde{P}_{CMAX,c}(i) - \{P_{O\_PUSCH,c}(1) + \alpha_c(1) \cdot PL_c + f_c\} \text{ [dB]};$$ Equation 3:

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of Maximum Power Reduction (MPR) is 0, the value of Additional-Maximum Power Reduction (A-MPR) is 0 dB, the value of Power Management Maximum Power Reduction (P-MPR) is 0, and the value of sideband transmit power reduction $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c.

Particularly for each of the uplink carriers on which PUCCHs can be transmitted, the network side can determine that the Type 2 PH corresponding to the uplink carrier is generated by the user equipment according to the uplink transmission related information of uplink carriers linked to the respective downlink carriers in the set of carriers corresponding to the uplink carrier particularly as follows:

If the network side determines that the user equipment transmits both a PUCCH and a PUSCH on the uplink carrier in the current uplink sub-frame i, then the network side determines that the user equipment generates the Type 2 PH of the uplink carrier in accordance with Equation 4 below;

If the network side determines that the user equipment transmits a PUSCH but no PUCCH on the uplink carrier in the current uplink sub-frame i, then the network side determines that the user equipment generates the Type 2 PH of the uplink carrier in accordance with Equation 5 below;

If the network side determines that the user equipment transmits a PUCCH but no PUSCH on the uplink carrier in the current uplink sub-frame i, then the network side determines that the user equipment generates the Type 2 PH of the uplink carrier in accordance with Equation 6 below; and If the network side determines that the user equipment transmits neither PUSCH nor PUCCH on the uplink carrier in the current uplink sub-frame i, then the network side determines that the user equipment generates the Type 2 PH of the uplink carrier in accordance with Equation 7 below;

$$PH_{type\,2,c}(i) = P_{CMAX,c}(i) - 10\log_{10}\left(10^{(10\log_{10}(M_{PUSCH,c}(i))+P_{O\_PUSCH,c}(j)+\alpha_c(j)\cdot PL_c+\Delta_{TF,c}(i)+f_c(i))/10} + 10^{(P_{0\_PUCCH,c}+PL_c+h_c(n_{CQI},n_{HARQ},n_{SR})+\Delta_{F\_PUCCH,c}(F)+\Delta_{TxD,c}(F')+g_c(i))/10}\right) \text{ [dB]}; \quad \text{Equation 4}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type\,2,c}(i) = P_{CMAX,c}(i) - 10\log_{10}\left(10^{(10\log_{10}(M_{PUSCH,c}(i))+P_{O\_PUSCH,c}(j)+\alpha_c(j)\cdot PL_c+\Delta_{TF,c}(i)+f_c(i))/10} + 10^{(P_{0\_PUCCH,c}+PL_c+g_c(i))/10}\right) \text{ [dB]}; \quad \text{Equation 5}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type\,2,c}(i) = P_{CMAX,c}(i) - 10\log_{10}\left(10^{(P_{O\_PUSCH,c}(1)+\alpha_c(1)\cdot PL_c+f_c(i))/10} + 10^{(P_{0\_PUCCH,c}+PL_c+h_c(n_{CQI},n_{HARQ},n_{SR})+\Delta_{F\_PUCCH,c}(F)+\Delta_{TxD,c}(F')+g_c(i))/10}\right) \text{ [dB]}; \quad \text{Equation 6}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent predefined parameters for calculating power of the PUCCH transmitted in the current uplink sub-frame i on the uplink carrier c; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c; and $$PH_{type\,2,c}(i) = \tilde{P}_{CMAX,c}(i) - 10\log_{10}\left(10^{(P_{O\_PUSCH,c}(1)+\alpha_c(1)\cdot PL_c+f_c(i))/10} + 10^{(P_{0\_PUCCH,c}+PL_c+g_c(i))/10}\right) \text{ [dB]}; \quad \text{Equation 7}$$

Where c represents the carrier index of the uplink carrier; $P_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c; and $P_{O\_PUCCH,c}$, $PL_c$ and $g_c(i)$ represent predefined parameters for calculating power of virtual PUCCH transmission in the current uplink sub-frame i on the uplink carrier c.

In another implementation, after the operation 61, for each of the uplink carriers on which PUCCHs can be transmitted and the uplink carriers other than the uplink carriers on which PUCCHs can be transmitted, the network side determines that the Type 1 PH corresponding to the uplink carrier is generated by the user equipment according to uplink transmission related information of all the uplink carriers; and For each of the uplink carriers on which PUCCHs can be transmitted, the network side determines that the Type 2 PH corresponding to the uplink carrier is generated by the user equipment according to the uplink transmission related information of all the uplink carriers.

Particularly for each of the uplink carriers on which PUCCHs can be transmitted and the uplink carriers other than the uplink carriers on which PUCCHs can be transmitted, the network side can determine that the Type 1 PH corresponding to the uplink carrier is determined by the user equipment according to the uplink transmission related information of all the uplink carriers particularly as follows:

If the network side determines that the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, then the network side determines that the user equipment generates the Type 1 PH of the uplink carrier in accordance with Equation 8 below;

If the network side determines that the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, then the network side determines that the user equipment generates the Type 1 PH of the uplink carrier in accordance with Equation 9 below; and If the network side determines that the user equipment does not transmit a PUSCH on the uplink carrier in the current uplink sub-frame i, then the network side determines that the user equipment generates the Type 1 PH of the uplink carrier in accordance with Equation 10 below; or Particularly for each of the uplink carriers on which PUCCHs can be transmitted and the uplink carriers other than the uplink carriers on which PUCCHs can be transmitted, the network side can alternatively determine that the Type 1 PH corresponding to the uplink carrier is generated by the user equipment according to the uplink transmission related information of all the uplink carriers particularly as follows:

If the network side determines that the user equipment transmits a PUSCH but no PUCCH on the uplink carrier in the current uplink sub-frame i, then the network side determines that the user equipment generates the Type 1 PH of the uplink carrier in accordance with Equation 8 below;

If the network side determines that the user equipment transmits both a PUSCH and a PUCCH on the uplink carrier in the current uplink sub-frame i, then the network side determines that the user equipment generates the Type 1 PH of the uplink carrier in accordance with Equation 9 below; and If the network side determines that the user equipment does not transmit a PUSCH on the uplink carrier in the current uplink sub-frame i, then the network side determines that the user equipment generates the Type 1 PH of the uplink carrier in accordance with Equation 10 below;

$$PH_{type1,c}(i) = P_{CMAX,c}(i) - \{10\log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}; \quad \text{Equation 8:}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10\log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}; \quad \text{Equation 9:}$$

Where c represents the carrier index of the uplink carrier; $\tilde{P}_{CMAX,c}(i)$ represents maximum transmit power of the user equipment on the uplink carrier c in the current uplink sub-frame i, where suppose only PUSCHs are transmitted on all the uplink carriers in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers of the user equipment other than the uplink carrier c; and, and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c; and $$PH_{type1,c}(i) = \tilde{P}_{CMAX,c}(i) - \{P_{O\_PUSCH,c}(1) + \alpha_c(1) \cdot PL_c + f_c(i)\} \text{ [dB]}; \quad \text{Equation 10:}$$

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c.

Particularly for each of the uplink carriers on which PUCCHs can be transmitted, the network side can determine that the Type 2 PH corresponding to the uplink carrier is generated by the user equipment according to the uplink transmission related information of all the uplink carriers particularly as follows:

If the network side determines that the user equipment transmits both a PUCCH and a PUSCH on the uplink carrier in the current uplink sub-frame i, then the network side determines that the user equipment generates the Type 2 PH of the uplink carrier in accordance with Equation 11 below;

If the network side determines that the user equipment transmits a PUSCH but no PUCCH on the uplink carrier in the current uplink sub-frame i, then the network side determines that the user equipment generates the Type 2 PH of the uplink carrier in accordance with Equation 12 below;

If the network side determines that the user equipment transmits a PUCCH but no PUSCH on the uplink carrier in the current uplink sub-frame i, then the network side determines that the user equipment generates the Type 2 PH of the uplink carrier in accordance with Equation 13 below; and If the network side determines that the user equipment transmits neither PUCCH nor PUSCH on the uplink carrier in the current uplink sub-frame i, then the network side determines that the user equipment generates the Type 2 PH of the uplink carrier in accordance with Equation 14 below;

$$PH_{type2,c}(i) = P_{CMAX,c}(i) - 10\log_{10}\left(\begin{array}{c}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right) \text{[dB]}; \quad \text{Equation 11}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(\begin{array}{c}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH,c}+PL_c+g_c(i))/10}\end{array}\right) \text{[dB]}; \quad \text{Equation 12}$$

Where c represents the carrier index of the uplink carrier; $P_{CMAX,c}(i)$ carrier; represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(\begin{array}{c}10^{(P_{O\_PUSCH,c}(1)+\alpha_c(1)\cdot PL_c+f_c(i))/10} + \\ 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right) \text{[dB]}; \quad \text{Equation 13}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c; and $$PH_{type2,c}(i) = \tilde{P}_{CMAX,c}(i) - 10\log_{10}\left(\begin{array}{c}10^{(P_{O\_PUSCH,c}(1)+\alpha_c(1)\cdot PL_c+f_c(i))/10} + \\ 10^{(P_{O\_PUCCH,c}+PL_c+g_c(i))/10}\end{array}\right) \text{[dB]}; \quad \text{Equation 14}$$

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; $P_{O\_PUSCH,c}(1)$, $\alpha_c(1)$, $PL_c$ and $f_c(i)$ represent predefined parameters for calculating power of virtual PUSCH transmission in the current uplink carrier i on the uplink carrier c; and $P_{O\_PUCCH,c}$, $PL_c$ and $g_c(i)$ represent predefined parameters for calculating power of virtual PUCCH transmission in the current uplink carrier i on the uplink carrier c.

It shall be noted that in the embodiments above, when the uplink transmission related information does not particularly refer to uplink transmission related information corresponding some uplink channel (e.g., a PUSCH), the uplink transmission related information of an uplink carrier typically refers to uplink transmission related information of real uplink transmission (e.g., PUCCH transmission, PUSCH transmission, SRS transmission, etc.) on the uplink carrier.

In the method, the power reductions include but will not be limited to the MPR and the A-MPR; and the uplink transmission related information includes one or a combination of uplink transmission bandwidth, modulation order and RB allocation information.

The invention will be described below in connection with particular embodiments thereof As illustrated in FIG. 4, there are five carriers C1, C2, C3, C4 and C5 in the system, where C1 is a PCC of the UE, and the base station groups the five carriers into three sets of carriers, where $S_1=\{C1, C2\}$, $S_2=\{C3, C4\}$, and $S_3=\{C5\}$, and determines an uplink carrier, on which a PUCCH can be transmitted, corresponding to the set $S_1$ of carriers (for example, on which ACK/NACK information corresponding to the downlink carriers of the set of carriers can be fed back in the PUCCH) as $C_{UL,1}$, an uplink carrier, on which a PUCCH can be transmitted, corresponding to $S_2$ as $C_{UL,4}$, and an uplink carrier, on which a PUCCH can be transmitted, corresponding to $S_3$ as $C_{UL,5}$, where uplink channels of the respective uplink carriers of the UE in the current uplink sub-frame are as illustrated in the right column in FIG. 4, and a PH of each of the uplink carriers is calculated as follows:

In a first approach, only uplink transmission related information on uplink carriers linked to the respective downlink carriers in the set of carriers corresponding to the uplink carrier is taken into account;

For the uplink carrier $C_{UL,1}$, both a Type 1 PH and a Type 2 PH need to be reported:

Since there is a PUSCH transmitted on the current uplink carrier $C_{UL,1}$, and there is a PUCCH on one of the uplink carriers $C_{UL,1}$ and $C_{UL,2}$ respectively linked to the downlink carriers C1 and C2 in the set $S_1$ of carriers, the Type 1 PH satisfies the condition of Equation 2 and is determined in accordance with Equation 2, where power reductions of $\tilde{P}_{CMAX,c}(i)$ are determined according to the transmission related information of the PUSCHs on the uplink carriers $C_{UL,1}$ and $C_{UL,2}$ linked respectively to the downlink carriers C1 and C2 in the set $S_1$ of carriers, that is, suppose there is no PUCCH transmitted on the uplink carrier $C_{UL,1}$, then the power reductions are determined only from a transmission bandwidth, a modulation order, RB allocation and other information of the PUSCH on the current uplink carrier $C_{UL,1}$ in the case of inter-band CA, and determined according to the sum of transmission bandwidths, higher one of modulation orders, RB allocation and other information of the PUSCHs on the uplink carriers $C_{UL,1}$ and $C_{UL,2}$ in the case of intra-band CA; or Since there are both a PUSCH and a PUCCH transmitted on the current uplink carrier $C_{UL,1}$, the Type 1 PH satisfies the condition of Equation 2 and is determined in accordance with Equation 2, where power reductions of $\tilde{P}_{CMAX,c}(i)$ are determined according to the uplink transmission related information corresponding to the PUSCH on the uplink carrier $C_{UL,1}$, and the uplink transmission related information of the uplink carrier $C_{UL,2}$, other than the uplink carrier $C_{UL,1}$, linked to the respective downlink carriers in the set of carriers corresponding to the uplink carrier c, that is, suppose there is no PUCCH transmitted on the uplink carrier $C_{UL,1}$, then the power reductions are determined only from a transmission bandwidth, a modulation order, RB allocation and other information of the PUSCH on the current uplink carrier $C_{UL,1}$ in the case of inter-band CA, and determined according to the sum of transmission bandwidths, higher one of modulation orders, RB allocation and other information of the PUSCHs on the uplink carriers $C_{UL,1}$ and $C_{UL,2}$ in the case of intra-band CA; and The Type 2 PH satisfies the condition of Equation 4 and is determined in accordance with Equation 4, where power reductions of $\tilde{P}_{CMAX,c}(i)$ are determined according to the transmission related information of real uplink channels (i.e., the PUCCH and the PUSCH in this example) on the uplink carriers $C_{UL,1}$ and $C_{UL,2}$ linked respectively to the downlink carriers C1 and C2 in the set $S_1$ of carriers, that is, the power reductions are determined only from the sum of transmission bandwidths, the higher one of modulation orders, RB allocation and other information of the PUCCH and the PUSCH on the current uplink carrier $C_{UL,1}$ in the case of inter-band CA, and determined according to the sum of transmission bandwidths, the highest one of modulation orders, RB allocation and other information of the PUCCH and the PUSCHs on the uplink carriers $C_{UL,1}$ and $C_{UL,2}$ in the case of intra-band CA;

For the uplink carrier $C_{UL,2}$, only a Type 1 PH needs to be reported:

Since there is a PUSCH transmitted on the current uplink carrier $C_{UL,2}$, and there is a PUCCH on one of the uplink carriers $C_{UL,1}$ and $C_{UL,2}$ respectively linked to the downlink carriers C1 and C2 in the set $S_1$ of carriers, the Type 1 PH satisfies the condition of Equation 2 and is determined in accordance with Equation 2, where power reductions of $\tilde{P}_{CMAX,c}(i)$ are determined according to the transmission related information of the PUSCHs on the uplink carriers $C_{UL,1}$ and $C_{UL,2}$ linked respectively to the downlink carriers C1 and C2 in the set $S_1$ of carriers, that is, suppose there is no PUCCH transmitted on the uplink carrier $C_{UL,1}$, then the power reductions are determined only from a transmission bandwidth, a modulation order, RB allocation and other information of the PUSCH on the current uplink carrier $C_{UL,2}$ in the case of inter-band CA, and determined according to the sum of transmission bandwidths, higher one of modulation orders, RB allocation and other information of the PUSCHs on the uplink carriers $C_{UL,1}$ and $C_{UL,2}$ in the case of intra-band CA; or Since there is a PUSCH but no PUCCH transmitted on the current uplink carrier $C_{UL,2}$, the Type 1 PH satisfies the condition of Equation 1 and is determined in accordance with Equation 1, where power reductions of $P_{CMAX,c}(i)$ are determined according to the uplink transmission related information on the uplink carriers $C_{UL,1}$ and $C_{UL,2}$ linked respectively to the downlink carriers C1 and C2 in the set $S_1$ of carriers corresponding to the uplink carrier $C_{UL,1}$, that is, the power reductions are determined only from a transmission bandwidth, a modulation order, RB allocation and other information of the PUSCH on the current uplink carrier $C_{UL,2}$ in the case of inter-band CA, and determined according to the sum of transmission bandwidths, the highest one of modulation orders, RB allocation and other information of all the PUCCH and PUSCHs on the uplink carriers $C_{UL,1}$ and $C_{UL,2}$ in the case of intra-band CA;

For the uplink carrier $C_{UL,3}$, only a Type 1 PH needs to be reported:

Since there is a PUSCH transmitted on the current uplink carrier $C_{UL,3}$, and there is a PUCCH on one of the uplink carriers $C_{UL,3}$ and $C_{UL,4}$ respectively linked to the downlink carriers C3 and C4 in the set $S_2$ of carriers, the Type 1 PH satisfies the condition of Equation 2 and is determined in accordance with Equation 2, where power reductions of $\tilde{P}_{CMAX,c}(i)$ are determined according to the transmission related information of the PUSCHs on the uplink carriers $C_{UL,3}$ and $C_{UL,4}$ linked respectively to the downlink carriers C3 and C4 in the set $S_2$ of carriers, that is, suppose there is no PUCCH transmitted on the uplink carrier $C_{UL,4}$, then the power reductions are determined only from a transmission bandwidth, a modulation order, RB allocation and other information of the PUSCH on the current uplink carrier $C_{UL,3}$ in the case of inter-band CA, and determined only from a transmission bandwidth, a modulation order, RB allocation and other information of the PUSCH on the uplink carrier $C_{UL,3}$ in the case of intra-band CA; or Since there is a PUSCH but no PUCCH transmitted on the current uplink carrier $C_{UL,3}$, the Type 1 PH satisfies the condition of Equation 1 and is determined in accordance with Equation 1, where power reductions of $P_{CMAX,c}(i)$ are determined according to the uplink transmission related information on the uplink carriers $C_{UL,3}$ and $C_{UL,4}$ linked respectively to the downlink carriers C3 and C4 in the set $S_2$ of carriers corresponding to the uplink carrier $C_{UL,3}$, that is, the power reductions are determined only from a transmission bandwidth, a modulation order, RB allocation and other information of the PUSCH on the current uplink carrier $C_{UL,3}$ in the case of inter-band CA, and determined according to the sum of transmission bandwidths, the highest one of modulation orders, RB allocation and other information of all the PUCCH and the PUSCH on the uplink carriers $C_{UL,3}$ and $C_{UL,4}$ in the case of intra-band CA;

For the uplink carrier $C_{UL,4}$, both a Type 1 PH and a Type 2 PH need to be reported:

Since there is no PUSCH transmitted on the current uplink carrier $C_{UL,4}$, the Type 1 PH satisfies the condition of Equation 3 and is determined in accordance with Equation 3, where power reductions of $\tilde{P}_{CMAX,c}(i)$ are determined assuming that MPR=0 dB, A-MPR=0 dB, P-MPR=0 dB, and $\Delta T_C$=0 dB; and The Type 2 PH satisfies the condition of Equation 6 and is determined in accordance with Equation 6, where power reductions of $P_{CMAX,c}(i)$ are determined according to the transmission related information of real uplink channels (i.e., the PUCCHs and the PUSCH in this example) on the uplink carriers $C_{UL,3}$ and $C_{UL,4}$ linked respectively to the downlink carriers C3 and C4 in the set $S_2$ of carriers, that is, the power reductions are determined only from a transmission bandwidth, a modulation order, RB allocation and other information of the PUCCH on the current uplink carrier $C_{UL,4}$ in the case of inter-band CA, and determined according to the sum of transmission bandwidths, the highest one of modulation orders, RB allocation and other information of the PUCCH and the PUSCH on the uplink carriers $C_{UL,3}$ and $C_{UL,4}$ in the case of intra-band CA; and For the uplink carrier $C_{UL,5}$, both a Type 1 PH and a Type 2 PH need to be reported:

Since there is a PUSCH transmitted on the current uplink carrier $C_{UL,5}$, and there is no PUCCH on the uplink carrier $C_{UL,5}$ linked to the downlink carrier C5 in the set $S_3$ of carriers, the Type 1 PH satisfies the condition of Equation 1 and is determined in accordance with Equation 1, where power reductions of $P_{CMAX,c}(i)$ are determined according to the transmission related information of the uplink channel (i.e., the PUSCH here) on the uplink carrier $C_{UL,5}$ linked to the downlink carrier C5 in the set $S_3$ of carriers, that is, the power reductions are determined only from a transmission bandwidth, a modulation order, RB allocation and other information of the PUSCH on the current uplink carrier $C_{UL,5}$ in the case of inter-band CA and intra-band CA; or Since there is a PUSCH but no PUCCH transmitted on the current uplink carrier $C_{UL,5}$, the Type 1 PH satisfies the condition of Equation 1 and is determined in accordance with Equation 1, where power reductions of $P_{CMAX,c}(i)$ are determined according to the transmission related information of the uplink channel (i.e., the PUSCH here) on the uplink carrier $C_{UL,5}$ linked to the downlink carrier C5 in the set $S_3$ of carriers, that is, the power reductions are determined only from a transmission bandwidth, a modulation order, RB allocation and other information of the PUSCH on the current uplink carrier $C_{UL,5}$ in the case of inter-band CA and intra-band CA; and The Type 2 PH satisfies the condition of Equation 5 and is determined in accordance with Equation 5, where power reductions of $P_{CMAX,c}(i)$ are determined according to the transmission related information of a real uplink channel (i.e., the PUSCH in this example) on the uplink carrier $C_{UL,5}$ linked to the downlink carrier C5 in the set $S_3$ of carriers, that is, the power reductions are determined only from a transmission bandwidth, a modulation order, RB allocation and other information of the PUSCH on the current uplink carrier $C_{UL,5}$ in the case of inter-band CA and intra-band CA.

In a second approach, uplink transmission related information on all the uplink carriers is taken into account;

For the uplink carrier $C_{UL,1}$, both a Type 1 PH and a Type 2 PH need to be reported:

Since there is a PUSCH transmitted on the current uplink carrier $C_{UL,1}$, and there are PUCCHs of the UE on the uplink carriers, e.g., the uplink carriers $C_{UL,1}$ and $C_{UL,4}$, linked to the downlink carriers in at least one of the sets of carriers, the Type 1 PH satisfies the condition of Equation 9 and is determined in accordance with Equation 9, where power reductions of $\tilde{P}_{CMAX,c}(i)$ are determined according to the transmission related information of the PUSCHs on all the uplink carriers, that is, suppose there is no PUCCH transmitted on the uplink carriers $C_{UL,1}$ and $C_{UL,4}$, then the power reductions are determined only from a transmission bandwidth, a modulation order, RB allocation and other information of the PUSCH on the current uplink carrier $C_{UL,1}$ in the case of inter-band CA, and determined according to the sum of transmission bandwidths, the highest one of modulation orders, RB allocation and other information of the PUSCHs on all the uplink carriers in the case of intra-band CA; or Since there is a PUSCH transmitted on the current uplink carrier $C_{UL,1}$, and there is also a PUCCH on the carrier, the Type 1 PH satisfies the condition of Equation 9 and is determined in accordance with Equation 9, where power reductions of $\tilde{P}_{CMAX,c}(i)$ are determined according to the uplink transmission related information corresponding to the PUSCH on the uplink carrier $C_{UL,1}$, and the uplink transmission related information of all the uplink carriers of the UE other than the uplink carrier $C_{UL,1}$, that is, suppose there is no PUCCH transmitted on the uplink carrier $C_{UL,1}$, then the power reductions are determined only from a transmission bandwidth, a modulation order, RB allocation and other information of the PUSCH on the current uplink carrier $C_{UL,1}$ in the case of inter-band CA, and determined according to the sum of transmission bandwidths, the highest one of modulation orders, RB allocation and other information of the PUSCH on the uplink carrier $C_{UL,1}$, and the PUCCHs and the PUSCHs on the other uplink carriers in the case of intra-band CA; and The Type 2 PH satisfies the condition of Equation 11 and is determined in accordance with Equation 11, where power reductions of $P_{CMAX,c}(i)$ are determined according to the transmission related information of real uplink channels on all the uplink carriers, that is, the power reductions are determined only from the sum of transmission bandwidths, higher one of modulation orders, RB allocation and other information of the PUCCH and the PUSCH on the current uplink carrier $C_{UL,1}$ in the case of inter-band CA, and determined according to the sum of transmission bandwidths, the highest one of modulation orders, RB allocation and other information of the PUCCHs and the PUSCHs on all the uplink carriers in the case of intra-band CA;

For the uplink carrier $C_{UL,2}$, only a Type 1 PH needs to be reported:

Since there is a PUSCH transmitted on the current uplink carrier $C_{UL,2}$, and there are PUCCHs of the UE on the uplink carriers, e.g., the uplink carriers $C_{UL,1}$ and $C_{UL,4}$, linked to the downlink carriers in at least one of the sets of carriers, the Type 1 PH satisfies the condition of Equation 9 and is determined in accordance with Equation 9, where power reductions of $\tilde{P}_{CMAX,c}(i)$ are determined according to the transmission related information of the PUSCHs on all the uplink carriers, that is, suppose there is no PUCCH transmitted on the uplink carriers $C_{UL,1}$ and $C_{UL,4}$, then the power reductions are determined only from a transmission bandwidth, a modulation order, RB allocation and other information of the PUSCH on the current uplink carrier $C_{UL,2}$ in the case of inter-band CA, and determined according to the sum of transmission bandwidths, the highest one of modulation orders, RB allocation and other information of the PUSCHs on all the uplink carriers in the case of intra-band CA; or Since there is a PUSCH transmitted on the current uplink carrier $C_{UL,2}$, and there is no PUCCH on the carrier, the Type 1 PH satisfies the condition of Equation 8 and is determined in accordance with Equation 8, where power reductions of $P_{CMAX,c}(i)$ are determined according to the uplink transmission related information of all the uplink carriers, that is, the power reductions are determined only from a transmission bandwidth, a modulation order, RB allocation and other information of the PUSCH on the current uplink carrier $C_{UL,2}$ in the case of inter-band CA, and determined according to the sum of transmission bandwidths, the highest one of modulation orders, RB allocation and other information of the PUCCHs and the PUSCHs on all the uplink carriers in the case of intra-band CA;

For the uplink carrier $C_{UL,3}$, only a Type 1 PH needs to be reported:

Since there is a PUSCH transmitted on the current uplink carrier $C_{UL,3}$, and there are PUCCHs of the UE on the uplink carriers, e.g., the uplink carriers $C_{UL,1}$ and $C_{UL,4}$, linked to the downlink carriers in at least one of the sets of carriers, the Type 1 PH satisfies the condition of Equation 9 and is determined in accordance with Equation 9, where power reductions of $\tilde{P}_{CMAX,c}(i)$ are determined according to the transmission related information of the PUSCHs on all the uplink carriers, that is, suppose there is no PUCCH transmitted on the uplink carriers $C_{UL,1}$ and $C_{UL,4}$, then the power reductions are determined only from a transmission bandwidth, a modulation order, RB allocation and other information of the PUSCH on the current uplink carrier $C_{UL,3}$ in the case of inter-band CA, and determined according to the sum of transmission bandwidths, the highest one of modulation orders, RB allocation and other information of the PUSCHs on all the uplink carriers in the case of intra-band CA; or Since there is a PUSCH transmitted on the current uplink carrier $C_{UL,3}$, and there is no PUCCH on the carrier, the Type 1 PH satisfies the condition of Equation 8 and is determined in accordance with Equation 8, where power reductions of $P_{CMAX,c}(i)$ are determined according to the uplink transmission related information of all the uplink carriers, that is, the power reductions are determined only from a transmission bandwidth, a modulation order, RB allocation and other information of the PUSCH on the current uplink carrier $C_{UL,3}$ in the case of inter-band CA, and determined according to the sum of transmission bandwidths, the highest one of modulation orders, RB allocation and other information of the PUCCHs and the PUSCHs on all the uplink carriers in the case of intra-band CA;

For the uplink carrier $C_{UL,4}$, both a Type 1 PH and a Type 2 PH need to be reported:

Since there is no PUSCH transmitted on the current uplink carrier $C_{UL,4}$, the Type 1 PH satisfies the condition of Equation 10 and is determined in accordance with Equation 10, that is, a virtual Type 1 PH is reported, where power reductions of $\tilde{P}_{CMAX,c}(i)$ are determined assuming that MPR=0 dB, A-MPR=0 dB, P-MPR=0 dB, and $\Delta T_C$=0 dB; and The Type 2 PH satisfies the condition of Equation 13 and is determined in accordance with Equation 13, where power reductions of $P_{CMAX,c}(i)$ are determined according to the transmission related information of real uplink channels on all the uplink carriers, that is, the power reductions are determined only from a transmission bandwidth, a modulation order, RB allocation and other information of the PUCCH on the current uplink carrier $C_{UL,4}$ in the case of inter-band CA, and determined according to the sum of transmission bandwidths, the highest one of modulation orders, RB allocation and other information of the PUCCHs and the PUSCHs on all the uplink carriers in the case of intra-band CA; and For the uplink carrier $C_{UL,5}$, both a Type 1 PH and a Type 2 PH need to be reported:

Since there is a PUSCH transmitted on the current uplink carrier $C_{UL,5}$, and there are PUCCHs of the UE on the uplink carriers, e.g., the uplink carriers $C_{UL,1}$ and $C_{UL,4}$, linked to the downlink carriers in at least one of the sets of carriers, the Type 1 PH satisfies the condition of Equation 9 and is determined in accordance with Equation 9, where power reductions of $\tilde{P}_{CMAX,c}(i)$ are determined according to the transmission related information of the PUSCHs on all the uplink carriers, that is, suppose there is no PUCCH transmitted on the uplink carriers $C_{UL,1}$ and $C_{UL,4}$, then the power reductions are determined only from a transmission bandwidth, a modulation order, RB allocation and other information of the PUSCH on the current uplink carrier $C_{UL,5}$ in the case of inter-band CA, and determined according to the sum of transmission bandwidths, the highest one of modulation orders, RB allocation and other information of the PUSCHs on all the uplink carriers in the case of intra-band CA; or Since there is a PUSCH transmitted on the current uplink carrier $C_{UL,5}$, but there is no PUCCH on the carrier, the Type 1 PH satisfies the condition of Equation 8 and is determined in accordance with Equation 8, where power reductions of $P_{CMAX,c}(i)$ are determined according to the uplink transmission related information of all the uplink carriers, that is, the power reductions are determined only from a transmission bandwidth, a modulation order, RB allocation and other information of the PUSCH on the current uplink carrier $C_{UL,5}$ in the case of inter-band CA, and determined according to the sum of transmission bandwidths, the highest one of modulation orders, RB allocation and other information of the PUCCHs and the PUSCHs on all the uplink carriers in the case of intra-band CA; and The Type 2 PH satisfies the condition of Equation 12 and is determined in accordance with Equation 12, where power reductions of $P_{CMAX,c}(i)$ are determined according to the transmission related information of real uplink channels on all the uplink carriers, that is, the power reductions are determined only from a transmission bandwidth, a modulation order, RB allocation and other information of the PUSCH on the current uplink carrier $C_{UL,5}$ in the case of inter-band CA, and determined according to the sum of transmission bandwidths, the highest one of modulation orders, RB allocation and other information of the PUCCHs and the PUSCHs on all the uplink carriers in the case of intra-band CA.

Figure 7:
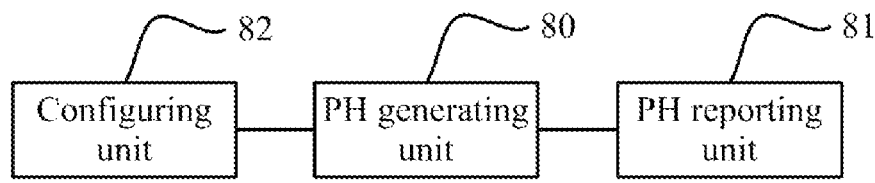
FIG. 7 illustrates a schematic structural diagram of a user equipment according to an embodiment of the invention.

Referring to FIG. 7, an embodiment of the invention provides a user equipment for which a plurality of downlink carriers are aggregated, where each of the downlink carriers is linked to an uplink carrier, the plurality of downlink carriers are grouped into a plurality of sets of carriers, and for each set of carriers, an uplink carrier linked to specified one of the downlink carriers in the set of carriers is specified as an uplink carrier, on which a Physical Uplink Control Channel (PUCCH) can be transmitted, corresponding to the set of carriers; and the user equipment includes:

A PH generating unit 80 is configured to generate a Type 1 PH and a Type 2 PH for each of a plurality of uplink carriers, on which PUCCHs can be transmitted, for which PHs need to be reported; and to generate a Type 1 PH for each of uplink carriers, for which PHs need to be reported, other than the uplink carriers on which PUCCHs can be transmitted; and A PH reporting unit 81 is configured to report the generated respective Type 1 PH and Type 2 PH to the network side in a current uplink sub-frame.

Furthermore the user equipment further includes:

A configuring unit 82 is configured, before the Type 1 PH and the Type 2 PH are generated for each of a plurality of uplink carriers, on which PUCCHs can be transmitted, for which PHs need to be reported, to group the plurality of downlink carriers aggregated for the user equipment into the plurality of sets of carriers according to configuration information transmitted by the network side, where each of the sets of carriers includes at least one of the downlink carriers; and For each of the sets of carriers, to determine the uplink carrier linked to specified one of the downlink carriers in the set of carrier as the uplink carrier, on which a PUCCH can be transmitted, corresponding to the set of carriers according to higher-layer signaling transmitted by the network side or as predefined with the network side.

Furthermore the PH generating unit 80 includes:

A first generating unit is configured, for each of the uplink carriers on which PUCCHs can be transmitted and the uplink carriers other than the uplink carriers on which PUCCHs can be transmitted, to generate the Type 1 PH of the uplink carrier according to uplink transmission related information of uplink carriers linked to the respective downlink carriers in the set of carriers corresponding to the uplink carrier; and A second generating unit is configured, for each of the uplink carriers on which PUCCHs can be transmitted, to generate the Type 2 PH of the uplink carrier according to the uplink transmission related information of the uplink carriers linked to the respective downlink carriers in the set of carriers corresponding to the uplink carrier;

Where the set of carriers corresponding to the uplink carrier refers to the set of carriers to which the downlink carrier linked to the uplink carrier belongs.

Furthermore the first generating unit is configured:

If the user equipment transmits a Physical Uplink Shared Channel (PUSCH) on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i, to generate the Type 1 PH of the uplink carrier in accordance with Equation 1 below;

If the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, to generate the Type 1 PH of the uplink carrier in accordance with Equation 2 below; and If the user equipment does not transmit a PUSCH on the uplink carrier in the current uplink sub-frame i, to generate the Type 1 PH of the uplink carrier in accordance with Equation 3 below;

Or

If the user equipment transmits a PUSCH but no PUCCH on the uplink carrier in the current uplink sub-frame i, to generate the Type 1 PH of the uplink carrier in accordance with Equation 1 below;

If the user equipment transmits both a PUSCH and a PUCCH on the uplink carrier in the current uplink sub-frame i, to generate the Type 1 PH of the uplink carrier in accordance with Equation 2 below; and If the user equipment does not transmit a PUSCH on the uplink carrier in the current uplink sub-frame i, to generate the Type 1 PH of the uplink carrier in accordance with Equation 3 below;

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}; \quad \text{Equation 1:}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}; \quad \text{Equation 2:}$$

Where c represents the carrier index of the uplink carrier; $\tilde{P}_{CMAX,c}(i)$ represents maximum transmit power of the user equipment on the uplink carrier c in the current uplink sub-frame i, where suppose only PUSCHs are transmitted on the uplink carriers linked to the respective downlink carriers in the set of carriers corresponding to the uplink carrier c in the current uplink sub frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers, other than the uplink carrier c, linked to the respective downlink carriers in the set of carriers corresponding to the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c; and $$PH_{type1,c}(i) = \tilde{P}_{CMAX,c}(i) - \{P_{O\_PUSCH,c}(1) + \alpha_c(1) \cdot PL_c + f_c\} \text{ [dB]}; \quad \text{Equation 3:}$$

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of Maximum Power Reduction (MPR) is 0, the value of Additional-Maximum Power Reduction (A-MPR) is 0 dB, the value of Power Management Maximum Power Reduction (P-MPR) is 0, and the value of sideband transmit power reduction $\Delta T_C$ is 0; and $P_{O\_PUSCH,c}(1)$, $\alpha_c(1)$, $PL_c$ d and $f_c(i)$ represent predefined parameters for calculating power of virtual PUSCH transmission in the current uplink sub-frame i on the uplink carrier c.

Furthermore the second generating unit is configured:

If the user equipment transmits both a PUCCH and a PUSCH on the uplink carrier in the current uplink sub-frame i, to generate the Type 2 PH of the uplink carrier in accordance with Equation 4 below;

If the user equipment transmits a PUSCH but no PUCCH on the uplink carrier in the current uplink sub-frame i, to generate the Type 2 PH of the uplink carrier in accordance with Equation 5 below;

If the user equipment transmits a PUCCH but no PUSCH on the uplink carrier in the current uplink sub-frame i, to generate the Type 2 PH of the uplink carrier in accordance with Equation 6 below; and If the user equipment transmits neither PUSCH nor PUCCH on the uplink carrier in the current uplink sub-frame i, to generate the Type 2 PH of the uplink carrier in accordance with Equation 7 below;

$$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right) [dB];$$

Equation 4

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent predefined parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier;

$$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH,c}+PL_c+g_c(i))/10}\end{array}\right) [dB];$$

Equation 5

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}$$

Equation 6

$$\left(\begin{array}{l}10^{(P_{O\_PUSCH,c}(1)+\alpha_c(1)\cdot PL_c+f_c(i))/10} + \\ 10^{(P_{0\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right)$$

[dB];

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent predefined parameters for calculating power of the PUCCH transmitted in the current uplink sub-frame i on the uplink carrier c; and $P_{O\_PUCCH,c}(1)$, $\alpha_c(1)$, $PL_c$ and $f_c(i)$ represent predefined parameters for calculating power of virtual PUSCH transmission in the current uplink sub-frame i on the uplink carrier c; and $$PH_{type2,c}(i) = \tilde{P}_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{0\_PUCCH,c}+PL_c+g_c(i))/10}\end{array}\right)[dB];$$

Equation 7

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; $P_{O\_PUCCH,c}(1)$, $\alpha_c(1)$, $PL_c$ and $f_c(i)$ represent predefined parameters for calculating power of virtual PUSCH transmission in the current uplink sub-frame i on the uplink carrier c; and $P_{O\_PUCCH,c}$, $PL_c$ and $g_c(i)$ represent predefined parameters for calculating power of virtual PUCCH transmission in the current uplink sub-frame i on the uplink carrier c.

Furthermore the PH generating unit 80 includes:

A third generating unit is configured for each of the uplink carriers on which PUCCHs can be transmitted and the uplink carriers other than the uplink carriers on which PUCCHs can be transmitted, to generate the Type 1 PH of the uplink carrier according to uplink transmission related information of all the uplink carriers; and A fourth generating unit is configured, for each of the uplink carriers on which PUCCHs can be transmitted, to generate the Type 2 PH of the uplink carrier according to the uplink transmission related information of all the uplink carriers.

Furthermore the third generating unit is configured:

If the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, to generate the Type 1 PH of the uplink carrier in accordance with Equation 8 below;

If the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, to generate the Type 1 PH of the uplink carrier in accordance with Equation 9 below; and If the user equipment does not transmit a PUSCH on the uplink carrier in the current uplink sub-frame i, to generate the Type 1 PH of the uplink carrier in accordance with Equation 10 below;

Or

If the user equipment transmits a PUSCH but no PUCCH on the uplink carrier in the current uplink sub-frame i, to generate the Type 1 PH of the uplink carrier in accordance with Equation 8 below;

If the user equipment transmits both a PUSCH and a PUCCH on the uplink carrier in the current uplink sub-frame i, to generate the Type 1 PH of the uplink carrier in accordance with Equation 9 below; and If the user equipment does not transmit a PUSCH on the uplink carrier in the current uplink sub-frame i, to generate the Type 1 PH of the uplink carrier in accordance with Equation 10 below;

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}; \quad \text{Equation 8:}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \text{ [dB]}; \quad \text{Equation 9:}$$

Where c represents the carrier index of the uplink carrier; $\tilde{P}_{CMAX,c}(i)$ represents maximum transmit power of the user equipment on the uplink carrier c in the current uplink sub-frame i, where suppose only PUSCHs are transmitted on all the uplink carriers in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers of the user equipment other than the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c; and $$PH_{type1,c}(i) = \tilde{P}_{CMAX,c}(i) - \{P_{O\_PUSCH,c}(1) + \alpha_c(1) \cdot PL_c + f_c(i)\} \text{ [dB]}; \quad \text{Equation 10:}$$

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c.

Furthermore the fourth generating unit is configured:

If the user equipment transmits both a PUCCH and a PUSCH on the uplink carrier in the current uplink sub-frame i, to generate the Type 2 PH of the uplink carrier in accordance with Equation 11 below;

If the user equipment transmits a PUSCH but no PUCCH on the uplink carrier in the current uplink sub-frame i, to generate the Type 2 PH of the uplink carrier in accordance with Equation 12 below;

If the user equipment transmits a PUCCH but no PUSCH on the uplink carrier in the current uplink sub-frame i, to generate the Type 2 PH of the uplink carrier in accordance with Equation 13 below; and If the user equipment transmits neither PUCCH nor PUSCH on the uplink carrier in the current uplink sub-frame i, to generate the Type 2 PH of the uplink carrier in accordance with Equation 14 below;

$$PH_{type2,c}(i) = P_{CMAX,c}(i) - 10\log_{10}\left(\begin{array}{l}10^{(10\log_{10}(M_{PUSCH,c}(i)) + P_{O\_PUSCH,c}(j) + \alpha_c(j) \cdot PL_c + \Delta_{TF,c}(i) + f_c(i))/10} + \\ 10^{(P_{0\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10}\end{array}\right) \text{ [dB]}; \quad \text{Equation 11}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current unlink sub-frame i on the unlink carrier c:

$$PH_{type\,2,c}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{O\_PUCCH,c} + PL_c + g_c(i))/10}\right) \text{ [dB]};$$

Equation 12

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$, and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

Furthermore the power reductions include the MPR and the A-MPR; and

The uplink transmission related information includes one or a combination of uplink transmission bandwidth, modulation order, and Resource Block (RB) allocation information.

Based upon the same inventive idea as the method, an embodiment of the invention further provides a user equipment for which a plurality of downlink carriers are aggregated, where the plurality of downlink carriers are grouped into a plurality of sets of carriers, and for each set of carriers, an uplink carrier linked to specified one of the downlink carriers in the set of carriers is specified as an uplink carrier, $$PH_{type\,2,c}(i) = P_{CMAX,c}(i) - 10\log_{10}\left(10^{(P_{O\_PUSCH,c}(1) + \alpha_c(1) \cdot PL_c + f_c(i))/10} + 10^{(P_{O\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10}\right) \text{ [dB]};$$

Equation 13

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $P_{O\_PUCCH,c}(1)$, $\alpha_c(1)$, $PL_c$ and $f_c(i)$ represent predefined parameters for calculating power of virtual PUSCH transmission in the current uplink sub-frame i on the uplink carrier c; and $$PH_{type\,2,c}(i) = \tilde{P}_{CMAX,c}(i) - 10\log_{10}\left(10^{(P_{O\_PUSCH,c}(1) + \alpha_c(1) \cdot PL_c + f_c(i))/10} + 10^{(P_{O\_PUCCH,c} + PL_c + g_c(i))/10}\right) \text{ [dB]};$$

Equation 14

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; $P_{O\_PUSCH,c}(1)$, $\alpha_c(1)$, $PL_c$ and $f_c(i)$ represent predefined parameters for calculating power of virtual PUSCH transmission in the current uplink carrier i on the uplink carrier c; and $P_{O\_PUCCH,c}$, $PL_c$ and $g_c(i)$ represent predefined parameters for calculating power of virtual PUCCH transmission in the current uplink carrier i on the uplink carrier c.

Furthermore the first generating unit is further configured to report $\tilde{P}_{CMAX,c}(i)$ to a higher layer of the user equipment when the Type 1 PH of the uplink carrier is generated in accordance with Equation 2.

Furthermore the third generating unit is further configured to report $\tilde{P}_{CMAX,c}(i)$ to a higher layer of the user equipment when the Type 1 PH of the uplink carrier is generated in accordance with Equation 9.

on which a Physical Uplink Control Channel (PUCCH) can be transmitted, corresponding to the set of carriers. The user equipment includes a processor and a radio frequency unit, where:

The processor is configured to generate a Type 1 PH and a Type 2 PH for each of a plurality of uplink carriers, on which PUCCHs can be transmitted, for which PHs need to be reported; and to generate a Type 1 PH for each of uplink carriers, for which PHs need to be reported, other than the uplink carriers on which PUCCHs can be transmitted; and The radio frequency unit is configured to report the generated respective Type 1 PH and Type 2 PH to the network side in a current uplink sub-frame.

In the solution according to the embodiment of the invention, the user equipment generates a Type 1 PH and a Type 2 PH for each of a plurality of uplink carriers, on which PUCCHs can be transmitted, for which PHs need to be reported; generates a Type 1 PH for each of uplink carriers, for which PHs need to be reported, other than the uplink carriers on which PUCCHs can be transmitted; and reports the generated respective Type 1 PH and Type 2 PH to the network side in a current uplink sub-frame. As can be apparent, when the user equipment supports transmission of PUCCHs on different uplink carriers corresponding to different sets of carriers, this solution proposes a particular implementation of the method for reporting PHs by a user equipment to thereby address the problem of how to report PHs when the user equipment supports transmission of PUCCHs on different uplink carriers corresponding to different sets of carriers.

Figure 8:
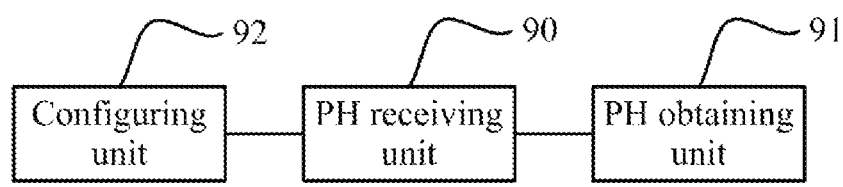
FIG. 8 illustrates a schematic structural diagram of a base station according to an embodiment of the invention.

Referring to FIG. 8, an embodiment of the invention provides a base station including:

A PH receiving unit 90 is configured to receive Power Headroom (PH) information reported by a user equipment for which a plurality of downlink carriers are aggregated, where the plurality of carriers are grouped into a plurality of sets of carriers; and for each of the sets of carriers, an uplink carrier linked to specified one of the downlink carriers in the set of carriers is specified as an uplink carrier, on which a Physical Uplink Control Channel (PUCCH) can be transmitted, corresponding to the set of carriers; and A PH obtaining unit 91 is configured to obtain from the PH information a Type 1 PH and a Type 2 PH corresponding respectively to each of a plurality of uplink carriers, on which PUCCHs can be transmitted, for which PHs need to be reported; and To obtain from the PH information a Type 1 PH corresponding respectively to each of uplink carriers, for which PHs need to be reported, other than the uplink carriers on which PUCCHs can be transmitted.

Furthermore the base station further includes:

A configuring unit 92 is configured to transmit configuration information to the user equipment to instruct the user equipment to group the plurality of aggregated downlink carriers into the plurality of sets of carriers, before the PH information reported by the user equipment is received, where each of the sets of carriers includes at least one of the downlink carriers; and To transmit higher-layer signaling to the user equipment to indicate for each of the sets of carriers the uplink carrier linked to specified one of the downlink carriers in the set of carriers as the uplink carrier, on which a PUCCH can be transmitted, corresponding to the set of carriers; or to determine for each of the sets of carriers the uplink carrier linked to specified one of the downlink carriers in the set of carriers as the uplink carrier, on which a PUCCH can be transmitted, corresponding to the set of carriers as predefined with the user equipment.

Furthermore the PH obtaining unit 91 is further configured:

For each of the uplink carriers on which PUCCHs can be transmitted and the uplink carriers other than the uplink carriers on which PUCCHs can be transmitted, to determine that the Type 1 PH corresponding to the uplink carrier is generated by the user equipment according to uplink transmission related information of uplink carriers linked to the respective downlink carriers in the set of carriers corresponding to the uplink carrier; and For each of the uplink carriers on which PUCCHs can be transmitted, to determine that the Type 2 PH of the uplink carrier is generated by the user equipment according to the uplink transmission related information of the uplink carriers linked to the respective downlink carriers in the set of carriers corresponding to the uplink carrier.

Furthermore the PH obtaining unit 91 is configured:

If it is determined that the user equipment transmits a Physical Uplink Shared Channel (PUSCH) on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i, to determine that the user equipment generates the Type 1 PH of the uplink carrier in accordance with Equation 1 below;

If it is determined that the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, to determine that the user equipment generates the Type 1 PH of the uplink carrier in accordance with Equation 2 below; and If it is determined that the user equipment does not transmit a PUSCH on the uplink carrier in the current uplink sub-frame i, to determine that the user equipment generates the Type 1 PH of the uplink carrier in accordance with Equation 3 below;

Or

If it is determined that the user equipment transmits a PUSCH but no PUCCH on the uplink carrier in the current uplink sub-frame i, to determine that the user equipment generates the Type 1 PH of the uplink carrier in accordance with Equation 1 below;

If it is determined that the user equipment transmits both a PUSCH and a PUCCH on the uplink carrier in the current uplink sub-frame i, to determine that the user equipment generates the Type 1 PH of the uplink carrier in accordance with Equation 2 below; and If it is determined that the user equipment does not transmit a PUSCH on the uplink carrier in the current uplink sub-frame i, to determine that the user equipment generates the Type 1 PH of the uplink carrier in accordance with Equation 3 below;

$$PH_{type1,c}(i) = P_{CMAX,c}(i) - \{10\log_{10}(M_{PUSCH,c}(i)) + P_{O\_PUSCH,c}(j) + \alpha_c(j) \cdot PL_c + \Delta_{TF,c}(i) + f_c(i)\} \text{ [dB]};$$ Equation 1:

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10\log_{10}(M_{PUSCH,c}(i)) + P_{O\_PUSCH,c}(j) + \alpha_c(j) \cdot PL_c + \Delta_{TF,c}(i) + f_c(i)\} \text{ [dB]};$$ Equation 2:

Where c represents the carrier index of the uplink carrier; $\tilde{P}_{CMAX,c}(i)$ represents maximum transmit power of the user equipment on the uplink carrier c in the current uplink sub-frame i, where suppose only PUSCHs are transmitted on the uplink carriers linked to the respective downlink carriers in the set of carriers corresponding to the uplink carrier c in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers, other than the uplink carrier c, linked to the respective downlink carriers in the set of carriers corresponding to the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c; and $$PH_{type1,c}(i) = \tilde{P}_{CMAX,c}(i) - \{P_{O\_PUSCH,c}(1) + \alpha_c(1) \cdot PL_c + f_c\} \text{ [dB]};$$ Equation 3:

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of Maximum Power Reduction (MPR) is 0, the value of Additional-Maximum Power Reduction (A-MPR) is 0 dB, the value of Power Management Maximum Power Reduction (P-MPR) is 0, and the value of sideband transmit power reduction $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c.

Furthermore the PH obtaining unit 91 is configured:

If it is determined that the user equipment transmits both a PUCCH and a PUSCH on the uplink carrier in the current uplink sub-frame i, to determine that the user equipment generates the Type 2 PH of the uplink carrier in accordance with Equation 4 below;

If it is determined that the user equipment transmits a PUSCH but no PUCCH on the uplink carrier in the current uplink sub-frame i, to determine that the user equipment generates the Type 2 PH of the uplink carrier in accordance with Equation 5 below;

If it is determined that the user equipment transmits a PUCCH but no PUSCH on the uplink carrier in the current uplink sub-frame i, to determine that the user equipment generates the Type 2 PH of the uplink carrier in accordance with Equation 6 below; and If it is determined that the user equipment transmits neither PUSCH nor PUCCH on the uplink carrier in the current uplink sub-frame i, to determine that the user equipment generates the Type 2 PH of the uplink carrier in accordance with Equation 7 below;

$$PH_{type2,c}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10}\right) \text{ [dB];} \quad \text{Equation 4}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH,c} + PL_c + g_c(i))/10}\right) \text{ [dB];} \quad \text{Equation 5}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(10^{(P_{O\_PUSCH,c}(1) + \alpha_c(1) \cdot PL_c + f_c(i))/10} + 10^{(P_{0\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10}\right) \text{ [dB];} \quad \text{Equation 6}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent predefined parameters for calculating power of the PUCCH transmitted in the current uplink sub-frame i on the uplink carrier c; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c; and $$PH_{type2,c}(i) = \tilde{P}_{CMAX,c}(i) - 10\log_{10}\left(10^{(P_{O\_PUSCH,c}(1) + \alpha_c(1) \cdot PL_c + f_c(i))/10} + 10^{(P_{0\_PUCCH,c} + PL_c + g_c(i))/10}\right) \text{ [dB];} \quad \text{Equation 7}$$

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c; and $P_{O\_PUCCH,c}$, $PL_c$ and $g_c(i)$ represent predefined parameters for calculating power of virtual PUCCH transmission in the current uplink sub-frame i on the uplink carrier c.

Furthermore the PH obtaining unit 91 is further configured;

For each of the uplink carriers on which PUCCHs can be transmitted and the uplink carriers other than the uplink carriers on which PUCCHs can be transmitted, to determine that the Type 1 PH corresponding to the uplink carrier is generated by the user equipment according to uplink transmission related information of all the uplink carriers; and For each of the uplink carriers on which PUCCHs can be transmitted, to determine that the Type 2 PH corresponding to the uplink carrier is generated by the user equipment according to the uplink transmission related information of all the uplink carriers.

Furthermore the PH obtaining unit 91 is configured;

If it is determined that the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, to determine that the user equipment generates the Type 1 PH of the uplink carrier in accordance with Equation 8 below;

If it is determined that the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, to determine that the user equipment generates the Type 1 PH of the uplink carrier in accordance with Equation 9 below; and If it is determined that the user equipment does not transmit a PUSCH on the uplink carrier in the current uplink sub-frame i, to determine that the user equipment generates the Type 1 PH of the uplink carrier in accordance with Equation 10 below;

Or

If it is determined that the user equipment transmits a PUSCH but no PUCCH on the uplink carrier in the current uplink sub-frame i, to determine that the user equipment generates the Type 1 PH of the uplink carrier in accordance with Equation 8 below;

If it is determined that the user equipment transmits both a PUSCH and a PUCCH on the uplink carrier in the current uplink sub-frame i, to determine that the user equipment generates the Type 1 PH of the uplink carrier in accordance with Equation 9 below; and If it is determined that the user equipment does not transmit a PUSCH on the uplink carrier in the current uplink sub-frame i, to determine that the user equipment generates the Type 1 PH of the uplink carrier in accordance with Equation 10 below;

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \ [dB]; \quad \text{Equation 8:}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \ [dB]; \quad \text{Equation 9:}$$

Where c represents the carrier index of the uplink carrier; $\tilde{P}_{CMAX,c}(i)$ represents maximum transmit power of the user equipment on the uplink carrier c in the current uplink sub-frame i, where suppose only PUSCHs are transmitted on all the uplink carriers in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers of the user equipment other than the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c; and $$PH_{type1,c}(i) = \tilde{P}_{CMAX,c}(i) - \{P_{O\_PUSCH,c}(1) + \alpha_c(1) \cdot PL_c + f_c(i)\} \ [dB]; \quad \text{Equation 10:}$$

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c.

Furthermore the PH obtaining unit 91 is configured;

If it is determined that the user equipment transmits both a PUCCH and a PUSCH on the uplink carrier in the current uplink sub-frame i, to determine that the user equipment generates the Type 2 PH of the uplink carrier in accordance with Equation 11 below;

If it is determined that the user equipment transmits a PUSCH but no PUCCH on the uplink carrier in the current uplink sub-frame i, to determine that the user equipment generates the Type 2 PH of the uplink carrier in accordance with Equation 12 below;

If it is determined that the user equipment transmits a PUCCH but no PUSCH on the uplink carrier in the current uplink sub-frame i, to determine that the user equipment generates the Type 2 PH of the uplink carrier in accordance with Equation 13 below; and If it is determined that the user equipment transmits neither PUCCH nor PUSCH on the uplink carrier in the current uplink sub-frame i, to determine that the user equipment generates the Type 2 PH of the uplink carrier in accordance with Equation 14 below;

$$PH_{type2,c}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{O\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10}\right) \ [dB]; \quad \text{Equation 11}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH,c} + PL_c + g_c(i))/10}\right)[dB]; \quad \text{Equation 12}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$, and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(10^{(P_{O\_PUSCH,c}(1) + \alpha_c(1) \cdot PL_c + f_c(i))/10} + 10^{(P_{0\_PUCCH,c} + PL_c + h_c(n_{CQI},n_{HARQ},n_{SR}) + \Delta_{F\_PUCCH,c}(F) + \Delta_{TxD,c}(F') + g_c(i))/10}\right)[dB]; \quad \text{Equation 13}$$

Where c represents the carrier index of the uplink carrier; $P_{CMAX,c}(i)$ represents maximum transmit power of the user equipment on the uplink carrier c in the current uplink sub-frame i, where power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub frame i on the uplink carrier c; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c; and $$PH_{type2,c}(i) = \tilde{P}_{CMAX,c}(i) - 10\log_{10}\left(10^{(P_{O\_PUSCH,c}(1) + \alpha_c(1) \cdot PL_c + f_c(i))/10} + 10^{(P_{0\_PUCCH,c} + PL_c + g_c(i))/10}\right)[dB]; \quad \text{Equation 14}$$

Where c represents the carrier index of the uplink carrier; $\tilde{P}_{CMAX,c}(i)$ represents maximum transmit power of the user equipment on the uplink carrier c in the current uplink sub-frame i, where $\tilde{P}_{CMAX,c}(i)$ is determined assuming that the value of MPR is 0, the value of A-MPR is 0 dB, the value of P-MPR is 0, and the value of $\Delta T_C$ is 0; $P_{O\_PUSCH,c}(1)$, $\alpha_c(1)$ $PL_c$ and $f_c(i)$ represent predefined parameters for calculating power of virtual PUSCH transmission in the current uplink carrier i on the uplink carrier c; and $P_{O\_PUCCH,c}$, $PL_c$ and $g_c(i)$ represent predefined parameters for calculating power of virtual PUCCH transmission in the current uplink carrier i on the uplink carrier c.

Furthermore the power reductions include the MPR and the A-MPR; and

The uplink transmission related information includes uplink transmission bandwidth, modulation order, and Resource Block (RB) allocation information.

Based upon the same inventive idea as the method, an embodiment of the invention further provides a base station including a radio frequency unit and a processor, where:

The radio frequency unit is configured to receive Power Headroom (PH) information reported by a user equipment for which a plurality of downlink carriers are aggregated, where the plurality of carriers are grouped into a plurality of sets of carriers; and for each of the sets of carriers, an uplink carrier linked to specified one of the downlink carriers in the set of carriers is specified as an uplink carrier, on which a Physical Uplink Control Channel (PUCCH) can be transmitted, corresponding to the set of carriers; and The processor is configured to obtain from the PH information a Type 1 PH and a Type 2 PH corresponding respectively to each of a plurality of uplink carriers, on which PUCCHs can be transmitted, for which PHs need to be reported; and to obtain from the PH information a Type 1 PH corresponding respectively to each of uplink carriers, for which PHs need to be reported, other than the uplink carriers on which PUCCHs can be transmitted.

In the solution according to the embodiment of the invention, the user equipment generates a Type 1 PH and a Type 2 PH for each of a plurality of uplink carriers, on which PUCCHs can be transmitted, for which PHs need to be reported; generates a Type 1 PH for each of uplink carriers, for which PHs need to be reported, other than the uplink carriers on which PUCCHs can be transmitted; and reports the generated respective Type 1 PH and Type 2 PH to the network side in a current uplink sub-frame. As can be apparent, when the user equipment supports transmission of PUCCHs on different uplink carriers corresponding to different sets of carriers, this solution proposes a particular implementation of the method for reporting PHs by a user equipment to thereby address the problem of how to report PHs when the user equipment supports transmission of PUCCHs on different uplink carriers corresponding to different sets of carriers.

In summary, advantageous effects of the invention include:

In the solutions according to the embodiments of the invention, the user equipment generates a Type 1 PH and a Type 2 PH for each of a plurality of uplink carriers, on which PUCCHs can be transmitted, for which PHs need to be reported; generates a Type 1 PH for each of uplink carriers, for which PHs need to be reported, other than the uplink carriers on which PUCCHs can be transmitted; and reports the generated respective Type 1 PH and Type 2 PH to the network side in a current uplink sub-frame. As can be apparent, when the user equipment supports transmission of PUCCHs on different uplink carriers corresponding to different sets of carriers, the solutions propose particular implementations of the method for reporting PHs by a user equipment to thereby address the problem of how to report PHs when the user equipment supports transmission of PUCCHs on different uplink carriers corresponding to different sets of carriers.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for reporting Power Headrooms, PHs, under carrier aggregation, wherein a plurality of downlink carriers are aggregated for a user equipment, and the plurality of carriers are grouped into a plurality of sets of carriers; for each of the sets of carriers, an uplink carrier linked to specified one of the downlink carriers in the set of carriers is specified as an uplink carrier, on which a Physical Uplink Control Channel, PUCCH, can be transmitted, corresponding to the set of carriers; and the method comprises:
   generating, by the user equipment, a Type 1 PH and a Type 2 PH for each of a plurality of uplink carriers, on which PUCCHs can be transmitted, for which PHs need to be reported; and
   generating a Type 1 PH for each of uplink carriers, for which PHs need to be reported, other than the uplink carriers on which PUCCHs can be transmitted; and
   reporting, by the user equipment, the generated respective Type 1 PH and Type 2 PH to a network side in a current uplink sub-frame;
   wherein generating, by the user equipment, the Type 1 PH for each of the uplink carriers on which PUCCHs can be transmitted and the Type 1 PH for each of the uplink carriers other than the uplink carriers on which PUCCHs can be transmitted and/or the Type 2 PH comprises:
   in a first approach:
   for each of the uplink carriers on which PUCCHs can be transmitted and the uplink carriers other than the uplink carriers on which PUCCHs can be transmitted, generating, by the user equipment, the Type 1 PH of the uplink carrier according to uplink transmission related information of uplink carriers linked to the respective downlink carriers in the set of carriers corresponding to the uplink carrier; and
   for each of the uplink carriers on which PUCCHs can be transmitted, generating, by the user equipment, the Type 2 PH of the uplink carrier according to the uplink transmission related information of the uplink carriers linked to the respective downlink carriers in the set of carriers corresponding to the uplink carrier;
   wherein the set of carriers corresponding to the uplink carrier refers to the set of carriers to which the downlink carrier linked to the uplink carrier belongs;
   or
   in a second approach:
   for each of the uplink carriers on which PUCCHs can be transmitted and the uplink carriers other than the uplink carriers on which PUCCHs can be transmitted, generating, by the user equipment, the Type 1 PH of the uplink carrier according to uplink transmission related information of all the uplink carriers; and
   for each of the uplink carriers on which PUCCHs can be transmitted, generating, by the user equipment, the Type 2 PH of the uplink carrier according to the uplink transmission related information of all the uplink carriers.

2. The method according to claim 1, wherein before generating, by the user equipment, the Type 1 PH and the Type 2 PH for each of the plurality of uplink carriers, on which PUCCHs can be transmitted, for which PHs need to be reported, the method further comprises:
   grouping, by the user equipment, the plurality of downlink carriers aggregated for the user equipment into the plurality of sets of carriers according to configuration information transmitted by the network side, wherein each of the sets of carriers comprises at least one of the downlink carriers; and
   for each of the sets of carriers, determining, by the user equipment, the uplink carrier linked to specified one of the downlink carriers in the set of carrier as the uplink carrier, on which a PUCCH can be transmitted, corresponding to the set of carriers according to higher-layer signaling transmitted by the network side or as predefined with the network side.

3. The method according to claim 1, wherein when the user equipment operates in the first approach:
for each of the uplink carriers on which PUCCHs can be transmitted and the uplink carriers other than the uplink carriers on which PUCCHs can be transmitted, generating, by the user equipment, the Type 1 PH of the uplink carrier according to the uplink transmission related information of the uplink carriers linked to the respective downlink carriers in the set of carriers corresponding to the uplink carrier comprises:
if the user equipment transmits a Physical Uplink Shared Channel, PUSCH, on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i, then generating the Type 1 PH of the uplink carrier in accordance with Equation 1 below;
if the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, then generating the Type 1 PH of the uplink carrier in accordance with Equation 2 below;
if the user equipment does not transmit a PUSCH on the uplink carrier in the current uplink sub-frame i, then generating the Type 1 PH of the uplink carrier in accordance with Equation 3 below;
or
if the user equipment transmits a PUSCH but no PUCCH on the uplink carrier in the current uplink sub-frame i, then generating the Type 1 PH of the uplink carrier in accordance with Equation 1 below;
if the user equipment transmits both a PUSCH and a PUCCH on the uplink carrier in the current uplink sub-frame i, then generating the Type 1 PH of the uplink carrier in accordance with Equation 2 below;
if the user equipment does not transmit a PUSCH on the uplink carrier in the current uplink sub-frame i, then generating the Type 1 PH of the uplink carrier in accordance with Equation 3 below;

$$PH_{type1,c}(i)=P_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\}[dB]; \quad \text{Equation 1}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i)=\tilde{P}_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\}[dB]; \quad \text{Equation 2}$$

wherein c represents the carrier index of the uplink carrier; $\tilde{P}_{CMAX,c}(i)$ represents maximum transmit power of the user equipment on the uplink carrier c in the current uplink sub-frame i, wherein suppose only PUSCHs are transmitted on the uplink carriers linked to the respective downlink carriers in the set of carriers corresponding to the uplink carrier c in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers, other than the uplink carrier c, linked to the respective downlink carriers in the set of carriers corresponding to the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i)=\tilde{P}_{CMAX,c}(i)-\{P_{O\_PUSCH,c}(1)+\alpha_c(1)\cdot PL_c+f_c(i)\}[dB]; \quad \text{Equation 3}$$

wherein c represents the carrier index of the uplink carrier; $\tilde{P}_{CMAX,c}(i)$ represens maximum transmit power of the user equipment on the uplink carrier c in the current uplink sub-frame i, wherein $\tilde{P}_{CMAX,c}(i)$ is determined assuming that the value of Maximum Power Reduction, MPR is 0, the value of Additional-Maximum Power Reduction, A-MPR, is 0dB, the value of Power Management Maximum Power Reduction, P-MPR is 0, and the value of sideband transmit power reduction $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c.

4. The method according to claim 3, wherein when the user equipment generates the Type 1 PH of the uplink carrier in accordance with Equation 2, the method further comprises:
reporting, by a physical layer of the user equipment, $\tilde{P}_{CMAX,c}(i)$ to a higher layer of the user equipment.

5. The method according to claim 1, wherein when the user equipment operates in the first approach:
for each of the uplink carriers on which PUCCHs can be transmitted, generating, by the user equipment, the Type 2 PH of the uplink carrier according to the uplink transmission related information of the uplink carriers linked to the respective downlink carriers in the set of carriers corresponding to the uplink carrier comprises:
if the user equipment transmits both a PUCCH and a PUSCH on the uplink carrier in the current uplink sub-frame i, then generating the Type 2 PH of the uplink carrier in accordance with Equation 4 below;
if the user equipment transmits a PUSCH but no PUCCH on the uplink carrier in the current uplink sub-frame i, then generating the Type 2 PH of the uplink carrier in accordance with Equation 5 below;
if the user equipment transmits a PUCCH but no PUSCH on the uplink carrier in the current uplink sub-frame i, then generating the Type 2 PH of the uplink carrier in accordance with Equation 6 below;
if the user equipment transmits neither PUSCH nor PUCCH on the uplink carrier in the current uplink sub-frame i, then generating the Type 2 PH of the uplink carrier in accordance with Equation 7 below;

$$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right)[\text{dB}];$$

Equation 4 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH,c}+PL_c+g_c(i))/10}\end{array}\right)[\text{dB}];$$

Equation 5 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right)[\text{dB}];$$

Equation 6 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent predefined parameters for calculating power of the PUCCH transmitted in the current uplink sub-frame i on the uplink carrier c; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c;

$$PH_{type2,c}(i) = \tilde{P}_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{O\_PUCCH,c}+PL_c+g_c(i))/10}\end{array}\right)[\text{dB}];$$

Equation 7 wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ determined assuming that the value of MPR is 0, the value of A-MPR is 0dB, the value of P-MPR is 0, and the value of $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c; and $P_{O\_PUCCH,c}$, $PL_c$ and $g_c(i)$ represent predefined parameters for calculating power of virtual PUCCH transmission in the current uplink sub-frame i on the uplink carrier c.

6. The method according to claim 1, when the user equipment operates in the second approach:
for each of the uplink carriers on which PUCCHs can be transmitted and the uplink carriers other than the uplink carriers on which PUCCHs can be transmitted, generating, by the user equipment, the Type 1 PH of the uplink carrier according to the uplink transmission related information of all the uplink carriers comprises:
if the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, then generating the Type 1 PH of the uplink carrier in accordance with Equation 8 below;
if the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, then generating the Type 1 PH of the uplink carrier in accordance with Equation 9 below;

if the user equipment does not transmit a PUSCH on the uplink carrier in the current uplink sub-frame i, then generating the Type 1 PH of the uplink carrier in accordance with Equation 10 below;

or if the user equipment transmits a PUSCH but no PUCCH on the uplink carrier in the current uplink sub-frame i, then generating the Type 1 PH of the uplink carrier in accordance with Equation 8 below;

if the user equipment transmits both a PUSCH and a PUCCH on the uplink carrier in the current uplink sub-frame i, then generating the Type 1 PH of the uplink carrier in accordance with Equation 9 below;

if the user equipment does not transmit a PUSCH on the uplink carrier in the current uplink sub-frame i, then generating the Type 1 PH of the uplink carrier in accordance with Equation 10 below;

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB]; \quad \text{Equation 8}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB]; \quad \text{Equation 9}$$

wherein c represents the carrier index of the uplink carrier; $\tilde{P}_{CMAX,c}(i)$ represents maximum transmit power of the user equipment on the uplink carrier c in the current uplink sub-frame i, wherein suppose only PUSCHs are transmitted on all the uplink carriers in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers of the user equipment other than the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{P_{O\_PUSCH,c}(1) + \alpha_c(1) \cdot PL_c + f_c(i)\}[dB]; \quad \text{Equation 10}$$

wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0dB, the value of P-MPR is 0, and the value of $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c.

7. The method according to claim 6, wherein when the user equipment generates the Type 1 PH of the uplink carrier in accordance with Equation 9, the method further comprises:

reporting, by a physical layer of the user equipment, $\tilde{P}_{CMAX,c}(i)$ to a higher layer of the user equipment.

8. The method according to claim 1, when the user equipment operates in the second approach:

for each of the uplink carriers on which PUCCHs can be transmitted, generating, by the user equipment, the Type 2 PH of the uplink carrier according to the uplink transmission related information of all the uplink carriers comprises:

if the user equipment transmits both a PUCCH and a PUSCH on the uplink carrier in the current uplink sub-frame i, then generating the Type 2 PH of the uplink carrier in accordance with Equation 11 below;

if the user equipment transmits a PUSCH but no PUCCH on the uplink carrier in the current uplink sub-frame i, then generating the Type 2 PH of the uplink carrier in accordance with Equation 12 below;

if the user equipment transmits a PUCCH but no PUSCH on the uplink carrier in the current uplink sub-frame i, then generating the Type 2 PH of the uplink carrier in accordance with Equation 13 below;

if the user equipment transmits neither PUCCH nor PUSCH on the uplink carrier in the current uplink sub-frame i, then generating the Type 2 PH of the uplink carrier in accordance with Equation 14 below;

$$PH_{type2,c}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{O\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10}\right)[dB]; \quad \text{Equation 11}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH,c}+PL_c+g_c(i))/10}\end{array}\right)[dB];$$ Equation 12 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right)[dB];$$ Equation 13 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c;

$$PH_{type2,c}(i) = \tilde{P}_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{O\_PUCCH,c}+PL_c+g_c(i))/10}\end{array}\right)[dB];$$ Equation 14 wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0dB, the value of P-MPR is 0, and the value of $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink carrier i on the uplink carrier c; and $P_{O\_PUCCH,c}$, $PL_c$ and $g_c(i)$ represent predefined parameters for calculating power of virtual PUCCH transmission in the current uplink carrier i on the uplink carrier c.

9. A method for receiving Power Headrooms, PHs, under carrier aggregation, wherein a plurality of downlink carriers are aggregated for a user equipment, and the plurality of carriers are grouped into a plurality of sets of carriers; for each of the sets of carriers, an uplink carrier linked to specified one of the downlink carriers in the set of carriers is specified as an uplink carrier, on which a Physical Uplink Control Channel, PUCCH, can be transmitted, corresponding to the set of carriers; and the method comprises:

receiving, by a network side, PH information reported by the user equipment;

obtaining, by the network side, from the PH information a Type 1 PH and a Type 2 PH corresponding respectively to each of a plurality of uplink carriers, on which PUCCHs can be transmitted, for which PHs need to be reported; and obtaining, by the network side, from the PH information a Type 1 PH corresponding respectively to each of uplink carriers, for which PHs need to be reported, other than the uplink carriers on which PUCCHs can be transmitted;

wherein obtaining, by the network side, the Type 1 PH for each of the uplink carriers on which PUCCHs can be transmitted and the Type 1 PH for the uplink carriers other than the uplink carriers on which PUCCHs can be transmitted and/or the Type 2 PH from the PH information comprises:

in a first approach:

for each of the uplink carriers on which PUCCHs can be transmitted and the uplink carriers other than the uplink carriers on which PUCCHs can be transmitted, determining, by the network side, that the Type 1 PH corresponding to the uplink carrier is generated by the user equipment according to uplink transmission related information of uplink carriers linked to the respective downlink carriers in the set of carriers corresponding to the uplink carrier; and for each of the uplink carriers on which PUCCHs can be transmitted, determining, by the network side, that the Type 2 PH corresponding to the uplink carrier is generated by the user equipment according to the uplink transmission related information of the uplink carriers linked to the respective downlink carriers in the set of carriers corresponding to the uplink carrier;

or in a second approach:

for each of the uplink carriers on which PUCCHs can be transmitted and the uplink carriers other than the uplink carriers on which PUCCHs can be transmitted, determining, by the network side, that the Type 1 PH corresponding to the uplink carrier is generated by the user equipment according to uplink transmission related information of all the uplink carriers; and for each of the uplink carriers on which PUCCHs can be transmitted, determining, by the network side, that the Type 2 PH corresponding to the uplink carrier is generated by the user equipment according to the uplink transmission related information of all the uplink carriers.

10. The method according to claim 9, wherein before the network side receives the PH information reported by the user equipment, the method further comprises:

transmitting, by the network side, configuration information to the user equipment to instruct the user equipment to group the plurality of aggregated downlink carriers into the plurality of sets of carriers, wherein each of the sets of carriers includes at least one of the downlink carriers; and transmitting, by the network side, higher-layer signaling to the user equipment to indicate for each of the sets of carriers the uplink carrier linked to specified one of the downlink carriers in the set of carriers as the uplink carrier, on which a PUCCH can be transmitted, corresponding to the set of carriers; or determining, by the network side, for each of the sets of carriers the uplink carrier linked to specified one of the downlink carriers in the set of carriers as the uplink carrier, on which a PUCCH can be transmitted, corresponding to the set of carriers as predefined with the user equipment.

11. The method according to claim 9, wherein when the network side operates in the first approach:

for each of the uplink carriers on which PUCCHs can be transmitted and the uplink carriers other than the uplink carriers on which PUCCHs can be transmitted, determining, by the network side, that the Type 1 PH corresponding to the uplink carrier is generated by the user equipment according to the uplink transmission related information of the uplink carriers linked to the respective downlink carriers in the set of carriers corresponding to the uplink carrier comprises:

if the network side determines that the user equipment transmits a Physical Uplink Shared Channel, PUSCH, on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i, then determining, by the network side, that the user equipment generates the Type 1 PH of the uplink carrier in accordance with Equation 1 below;

if the network side determines that the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, then determining, by the network side, that the user equipment generates the Type 1 PH of the uplink carrier in accordance with Equation 2 below;

if the network side determines that the user equipment does not transmit a PUSCH on the uplink carrier in the current uplink sub-frame i, then determining, by the network side, that the user equipment generates the Type 1 PH of the uplink carrier in accordance with Equation 3 below;

or if the network side determines that the user equipment transmits a PUSCH but no PUCCH on the uplink carrier in the current uplink sub-frame i, then determining, by the network side, that the user equipment generates the Type 1 PH of the uplink carrier in accordance with Equation 1 below;

if the network side determines that the user equipment transmits both a PUSCH and a PUCCH on the uplink carrier in the current uplink sub-frame i, then determining, by the network side, that the user equipment generates the Type 1 PH of the uplink carrier in accordance with Equation 2 below;

if the network side determines that the user equipment does not transmit a PUSCH on the uplink carrier in the current uplink sub-frame i, then determining, by the network side, that the user equipment generates the Type 1 PH of the uplink carrier in accordance with Equation 3 below;

$$PH_{type1,c}(i)=P_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\}[\mathrm{dB}]; \quad \text{Equation 1}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i)=\tilde{P}_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\}[\mathrm{dB}]; \quad \text{Equation 2}$$

wherein c represents the carrier index of the uplink carrier; $\tilde{P}_{CMAX,c}(i)$ represents maximum transmit power of the user equipment on the uplink carrier c in the current uplink sub-frame i, wherein suppose only PUSCHs are transmitted on the uplink carriers linked to the respective downlink carriers in the set of carriers corresponding to the uplink carrier c in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers, other than the uplink carrier c, linked to the respective downlink carriers in the set of carriers corresponding to the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i)=\tilde{P}_{CMAX,c}(i)-\{P_{O\_PUSCH,c}(1)+\alpha_c(1)\cdot PL_c+f_c(i)\}[\mathrm{dB}]; \quad \text{Equation 3}$$

wherein c represents the carrier index of the uplink carrier; $\tilde{P}_{CMAX,c}(i)$ represens maximum transmit power of the user equipment on the uplink carrier c in the current uplink sub-frame i, wherein $\tilde{P}_{CMAX,c}(i)$ is determined assuming that the value of Maximum Power Reduction (MPR) is 0, the value of Additional-Maximum Power Reduction (A-MPR) is 0dB, the value of Power Management Maximum Power Reduction (P-MPR) is 0, and the value of sideband transmit power reduction $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c;

and/or for each of the uplink carriers on which PUCCHs can be transmitted, determining, by the network side, that the Type 2 PH corresponding to the uplink carrier is generated by the user equipment according to the uplink transmission related information of the uplink carriers linked to the respective downlink carriers in the set of carriers corresponding to the uplink carrier comprises:

if the network side determines that the user equipment transmits both a PUCCH and a PUSCH on the uplink carrier in the current uplink sub-frame i, then determining, by the network side, that the user equipment generates the Type 2 PH of the uplink carrier in accordance with Equation 4 below;

if the network side determines that the user equipment transmits a PUSCH but no PUCCH on the uplink carrier in the current uplink sub-frame i, then determining, by the network side, that the user equipment generates the Type 2 PH of the uplink carrier in accordance with Equation 5 below;

if the network side determines that the user equipment transmits a PUCCH but no PUSCH on the uplink carrier in the current uplink sub-frame i, then determining, by the network side, that the user equipment generates the Type 2 PH of the uplink carrier in accordance with Equation 6 below;

if the network side determines that the user equipment transmits neither PUSCH nor PUCCH on the uplink carrier in the current uplink sub-frame i, then determining, by the network side, that the user equipment generates the Type 2 PH of the uplink carrier in accordance with Equation 7 below;

$$PH_{type2,c}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10}\right) [dB];$$ Equation 4 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH,c} + PL_c + g_c(i))/10}\right) [dB];$$ Equation 5 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(10^{(P_{O\_PUSCH,c}(1) + \alpha_c(1) \cdot PL_c + f_c(i))/10} + 10^{(P_{0\_PUCCH,c} + PL_c + h_c(n_{CQI}, n_{HARQ}, n_{SR}) + \Delta_{F\_PUCCH,c}(F) + \Delta_{TxD,c}(F') + g_c(i))/10}\right) [dB];$$ Equation 6 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent predefined parameters for calculating power of the PUCCH transmitted in the current uplink sub-frame i on the uplink carrier c; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c;

$$PH_{type2,c}(i) = \tilde{P}_{CMAX,c}(i) - 10\log_{10}\left(10^{(P_{O\_PUSCH,c}(1) + \alpha_c(1) \cdot PL_c + f_c(i))/10} + 10^{(P_{0\_PUCCH,c} + PL_c + g_c(i))/10}\right) [dB];$$ Equation 7 wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0dB, the value of P-MPR is 0, and the value of $\Delta T_C$ is 0; $P_{O\_PUSCH,c}(1)$, $\alpha_c(1)$, $PL_c$, and $f_c(i)$ represent predefined parameters for calculating power of virtual PUSCH transmission in the current uplink sub-frame i on the uplink carrier c; and $P_{O\_PUCCH,c}$, $PL_c$ and $g_c(i)$ represent predefined parameters for calculating power of virtual PUCCH transmission in the current uplink sub-frame i on the uplink carrier c.

12. The method according to claim 9, when the network side operates in the second approach:

for each of the uplink carriers on which PUCCHs can be transmitted and the uplink carriers other than the uplink carriers on which PUCCHs can be transmitted, determining, by the network side, that the Type 1 PH corresponding to the uplink carrier is generated by the user equipment according to the uplink transmission related information of all the uplink carriers comprises:

if the network side determines that the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, then determining, by the network side, that the user equipment generates the Type 1 PH of the uplink carrier in accordance with Equation 8 below;

if the network side determines that the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, then determining, by the network side, that the user equipment generates the Type 1 PH of the uplink carrier in accordance with Equation 9 below;

if the network side determines that the user equipment does not transmit a PUSCH on the uplink carrier in the current uplink sub-frame i, then determining, by the network side, that the user equipment generates the Type 1 PH of the uplink carrier in accordance with Equation 10 below;

or if the network side determines that the user equipment transmits a PUSCH but no PUCCH on the uplink carrier in the current uplink sub-frame i, then determining, by the network side, that the user equipment generates the Type 1 PH of the uplink carrier in accordance with Equation 8 below;

if the network side determines that the user equipment transmits both a PUSCH and a PUCCH on the uplink carrier in the current uplink sub-frame i, then determining, by the network side, that the user equipment generates the Type 1 PH of the uplink carrier in accordance with Equation 9 below;

if the network side determines that the user equipment does not transmit a PUSCH on the uplink carrier in the current uplink sub-frame i, then determining, by the network side, that the user equipment generates the Type 1 PH of the uplink carrier in accordance with Equation 10 below;

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB]; \quad \text{Equation 8}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB]; \quad \text{Equation 9}$$

wherein c represents the carrier index of the uplink carrier; $\tilde{P}_{CMAX,c}(i)$ represents maximum transmit power of the user equipment on the uplink carrier c in the current uplink sub-frame i, wherein suppose only PUSCHs are transmitted on all the uplink carriers in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers of the user equipment other than the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{P_{O\_PUSCH,c}(1) + \alpha_c(1) \cdot PL_c + f_c(i)\}[dB]; \quad \text{Equation 10}$$

wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0dB, the value of P-MPR is 0, and the value of $\Delta T_C$ is 0; and $P_{O\_PUSCH,c}(1)$, $\alpha_c(1)$, $PL_c$, and $f_c(i)$ represent predefined parameters for calculating power of virtual PUSCH transmission in the current uplink sub-frame i on the uplink carrier c;

and/or for each of the uplink carriers on which PUCCHs can be transmitted, determining, by the network side, that the Type 2 PH corresponding to the uplink carrier is generated by the user equipment according to the uplink transmission related information of all the uplink carriers comprises:

if the network side determines that the user equipment transmits both a PUCCH and a PUSCH on the uplink carrier in the current uplink sub-frame i, then determining, by the network; side, that the user equipment generates the Type 2 PH of the uplink carrier in accordance with Equation 11 below;

if the network side determines that the user equipment transmits a PUSCH but no PUCCH on the uplink carrier in the current uplink sub-frame i, then determining, by the network side, that the user equipment generates the Type 2 PH of the uplink carrier in accordance with Equation 12 below;

if the network side determines that the user equipment transmits a PUCCH but no PUSCH on the uplink carrier in the current uplink sub-frame i, then determining, by the network side, that the user equipment generates the Type 2 PH of the uplink carrier in accordance with Equation 13 below;

if the network side determines that the user equipment transmits neither PUCCH nor PUSCH on the uplink carrier in the current uplink sub-frame i, then determining, by the network side, that the user equipment generates the Type 2 PH of the uplink carrier in accordance with Equation 14 below;

$$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right)[dB];$$

Equation 11 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c $$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH,c}+PL_c+g_c(i))/10}\end{array}\right)[dB];$$

Equation 12 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right)[dB];$$

Equation 13 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI}, n_{HARQ}, n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $P_{O\_PUSCH,c}(1)$, $\alpha_c(1)$, $PL_c$, and $f_c(i)$ represent predefined parameters for calculating power of virtual PUSCH transmission in the current uplink sub-frame i on the uplink carrier c;

$$PH_{type2,c}(i) = \tilde{P}_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{O\_PUCCH,c}+PL_c+g_c(i))/10}\end{array}\right)[dB];$$

Equation 14 wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0dB, the value of P-MPR is 0, and the value of $\Delta T_C$ is 0; $P_{O\_PUSCH,c}(1)$, $\alpha_c(1)$, $PL_c$ and $f_c(i)$ represent predefined parameters for calculating power of virtual PUSCH transmission in the current uplink carrier i on the uplink carrier c; and $P_{O\_PUCCH,c}$, $PL_c$ and $g_c(i)$ represent predefined parameters for calculating power of virtual PUCCH transmission in the current uplink carrier i on the uplink carrier c.

13. A user equipment, wherein a plurality of downlink carriers are aggregated for the user equipment, the plurality of downlink carriers are grouped into a plurality of sets of carriers, and for each set of carriers, an uplink carrier linked to specified one of the downlink carriers in the set of carriers is specified as an uplink carrier, on which a Physical Uplink Control Channel, PUCCH, can be transmitted, corresponding to the set of carriers; and the user equipment comprises one or more processors implementing a PH generating unit and a PH reporting unit:

the PH generating unit generating a Type 1 PH and a Type 2 PH for each of a plurality of uplink carriers, on which PUCCHs can be transmitted, for which PHs need to be reported; and generating a Type 1 PH for each of uplink carriers, for which PHs need to be reported, other than the uplink carriers on which PUCCHs can be transmitted; and the PH reporting unit reporting the generated respective Type 1 PH and Type 2 PH to a network side in a current uplink sub-frame;

wherein the PH generating unit comprises:

a first generating unit, for each of the uplink carriers on which PUCCHs can be transmitted and the uplink carriers other than the uplink carriers on which PUCCHs can be transmitted, generating the Type 1 PH of the uplink carrier according to uplink transmission related information of uplink carriers linked to the respective downlink carriers in the set of carriers corresponding to the uplink carrier; and a second generating unit configured, for each of the uplink carriers on which PUCCHs can be transmitted, generating the Type 2 PH of the uplink carrier according to the uplink transmission related information of the uplink carriers linked to the respective downlink carriers in the set of carriers corresponding to the uplink carrier;

wherein the set of carriers corresponding to the uplink carrier refers to the set of carriers to which the downlink carrier linked to the uplink carrier belongs;

or the PH generating unit comprises:

a third generating unit, for each of the uplink carriers on which PUCCHs can be transmitted and the uplink carriers other than the uplink carriers on which PUCCHs can be transmitted, generating the Type 1 PH of the uplink carrier according to uplink transmission related information of all the uplink carriers; and a fourth generating unit, for each of the uplink carriers on which PUCCHs can be transmitted, generating the Type 2 PH of the uplink carrier according to the uplink transmission related information of all the uplink carriers.

14. The user equipment according to claim 13, wherein the one or more processors further implementing a configuring unit, and before the Type 1 PH and the Type 2 PH are generated for each of a plurality of uplink carriers, on which PUCCHs can be transmitted, for which PHs need to be reported, the configuring unit groups the plurality of downlink carriers aggregated for the user equipment into the plurality of sets of carriers according to configuration information transmitted by the network side, wherein each of the sets of carriers comprises at least one of the downlink carriers; and for each of the sets of carriers, the configuring unit determines the uplink carrier linked to specified one of the downlink carriers in the set of carrier as the uplink carrier, on which a PUCCH can be transmitted, corresponding to the set of carriers according to higher-layer signaling transmitted by the network side or as predefined with the network side.

15. The user equipment according to claim 13, wherein when the PH generating unit comprises the first generating unit and the second generating unit:

the first generating unit is configured:

if the user equipment transmits a Physical Uplink Shared Channel, PUSCH, on the uplink carrier in the current uplink sub-frame i, and the user equipment does not transmit a PUCCH on any of the uplink carriers linked to the respective downlink carriers in the set of carriers corresponding to the uplink carrier in the current uplink sub-frame i, to generate the Type 1 PH of the uplink carrier in accordance with Equation 1 below;

if the user equipment transmits a PUSCH on the uplink carrier in the current uplink sub-frame i, and the user equipment transmits a PUCCH on at least one of the uplink carriers linked to the respective downlink carriers in the set of carriers corresponding to the uplink carrier in the current uplink sub-frame i, to generate the Type 1 PH of the uplink carrier in accordance with Equation 2 below;

if the user equipment does not transmit a PUSCH on the uplink carrier in the current uplink sub-frame i, to generate the Type 1 PH of the uplink carrier in accordance with Equation 3 below;

or if the user equipment transmits a PUSCH but no PUCCH on the uplink carrier in the current uplink sub-frame i, to generate the Type 1 PH of the uplink carrier in accordance with Equation 1 below;

if the user equipment transmits both a PUSCH and a PUCCH on the uplink carrier in the current uplink sub-frame i, to generate the Type 1 PH of the uplink carrier in accordance with Equation 2 below;

if the user equipment does not transmit a PUSCH on the uplink carrier in the current uplink sub-frame i, to generate the Type 1 PH of the uplink carrier in accordance with Equation 3 below;

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB]; \quad \text{Equation 1}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c;

and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB]; \quad \text{Equation 2}$$

wherein c represents the carrier index of the uplink carrier; $\tilde{P}_{CMAX,c}(i)$ represents maximum transmit power of the user equipment on the uplink carrier c in the current uplink sub-frame i, wherein suppose only PUSCHs are transmitted on the uplink carriers linked to the respective downlink carriers in the set of carriers corresponding to the uplink carrier c in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers, other than the uplink carrier c, linked to the respective downlink carriers in the set of carriers corresponding to the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i) = \tilde{P}_{CMAX,c}(i) - \{P_{O\_PUSCH,c}(1) + \alpha_c(1) \cdot PL_c + f_c(i)\}[dB]; \quad \text{Equation 3}$$

wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of Maximum Power Reduction (MPR) is 0, the value of Additional-Maximum Power Reduction (A-MPR) is 0dB, the value of Power Management Maximum Power Reduction (P-MPR) is 0, and the value of sideband transmit power reduction $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c;

and/or the second generating unit is configured:

if the user equipment transmits both a PUCCH and a PUSCH on the uplink carrier in the current uplink sub-frame i, to generate the Type 2 PH of the uplink carrier in accordance with Equation 4 below;

if the user equipment transmits a PUSCH but no PUCCH on the uplink carrier in the current uplink sub-frame i, to generate the Type 2 PH of the uplink carrier in accordance with Equation 5 below;

if the user equipment transmits a PUCCH but no PUSCH on the uplink carrier in the current uplink sub-frame i, to generate the Type 2 PH of the uplink carrier in accordance with Equation 6 below;

if the user equipment transmits neither PUSCH nor PUCCH on the uplink carrier in the current uplink sub-frame i, to generate the Type 2 PH of the uplink carrier in accordance with Equation 7 below;

$$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right)[dB];\quad \text{Equation 4}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier;

$$PH_{type2,c}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH,c}+PL_c+g_c(i))/10}\end{array}\right)[dB];\quad \text{Equation 5}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{0\_PUCCH,c}+PL_c+h_c(n_{CQI},n_{HARQ},n_{SR})+\Delta_{F\_PUCCH,c}(F)+\Delta_{TxD,c}(F')+g_c(i))/10}\end{array}\right)[dB];\quad \text{Equation 6}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of the uplink carriers linked to the respective downlink carriers in the set of carriers corresponding to the uplink carrier c; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent predefined parameters for calculating power of the PUCCH transmitted in the current uplink sub-frame i on the uplink carrier c; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c;

$$PH_{type2,c}(i) = \tilde{P}_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{0\_PUCCH,c}+PL_c+g_c(i))/10}\end{array}\right)[dB];\quad \text{Equation 7}$$

wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0dB, the value of P-MPR is 0, and the value of $\Delta T_C$ is 0; $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c; and $P_{O\_PUCCH,c}$, $PL_c$ and $g_c(i)$ represent predefined parameters for calculating power of virtual PUCCH transmission in the current uplink sub-frame i on the uplink carrier c;

or when the PH generating unit comprises the third generating unit and the fourth generating unit:

the third generating unit is configured:

if the user equipment transmits a PUSCH on the uplink carrier in the current uplink sub-frame i, and the user equipment does not transmit a PUCCH on an uplink carrier, on which a PUCCH can be transmitted, corresponding to any one of the sets of carriers in the current uplink sub-frame i, to generate the Type 1 PH of the uplink carrier in accordance with Equation 8 below;

if the user equipment transmits a PUSCH on the uplink carrier in the current uplink sub-frame i, and the user equipment transmits a PUCCH on an uplink carrier, on which a PUCCH can be transmitted, corresponding to at least one of the sets of carriers in the current uplink sub-frame i, to generate the Type 1 PH of the uplink carrier in accordance with Equation 9 below;

if the user equipment does not transmit a PUSCH on the uplink carrier in the current uplink sub-frame i, to generate the Type 1 PH of the uplink carrier in accordance with Equation 10 below;

or if the user equipment transmits a PUSCH but no PUCCH on the uplink carrier in the current uplink sub-frame i, to generate the Type 1 PH of the uplink carrier in accordance with Equation 8 below;

if the user equipment transmits both a PUSCH and a PUCCH on the uplink carrier in the current uplink sub-frame i, to generate the Type 1 PH of the uplink carrier in accordance with Equation 9 below;

if the user equipment does not transmit a PUSCH on the uplink carrier in the current uplink sub-frame i, to generate the Type 1 PH of the uplink carrier in accordance with Equation 10 below;

$$PH_{type1,c}(i)=P_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\}[dB]; \quad \text{Equation 8}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i)=\tilde{P}_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\}[dB]; \quad \text{Equation 9}$$

wherein c represents the carrier index of the uplink carrier; $\tilde{P}_{CMAX,c}(i)$ represents maximum transmit power of the user equipment on the uplink carrier c in the current uplink sub-frame i, wherein suppose only PUSCHs are transmitted on all the uplink carriers in the current uplink sub-frame i, then power reductions for determining $\tilde{P}_{CMAX,c}(i)$ are determined according to the uplink transmission related information corresponding to the PUSCHs, or suppose only a PUSCH is transmitted on the uplink carrier c in the current uplink sub-frame i, then power reductions for determining $\tilde{P}_{CMAX,c}(i)$ are determined according to the uplink transmission related information corresponding to the PUSCH on the uplink carrier c, and the uplink transmission related information of the uplink carriers of the user equipment other than the uplink carrier c; and $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type1,c}(i)=\tilde{P}_{CMAX,c}(i)-\{P_{O\_PUSCH,c}(1)+\alpha_c(1)\cdot PL_c+f_c(i)\}[dB]; \quad \text{Equation 10}$$

wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0dB, the value of P-MPR is 0, and the value of $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c;

and/or the fourth generating unit is configured:

if the user equipment transmits both a PUCCH and a PUSCH on the uplink carrier in the current uplink sub-frame i, to generate the Type 2 PH of the uplink carrier in accordance with Equation 11 below;

if the user equipment transmits a PUSCH but no PUCCH on the uplink carrier in the current uplink sub-frame i, to generate the Type 2 PH of the uplink carrier in accordance with Equation 12 below;

if the user equipment transmits a PUCCH but no PUSCH on the uplink carrier in the current uplink sub-frame i, to generate the Type 2 PH of the uplink carrier in accordance with Equation 13 below;

if the user equipment transmits neither PUCCH nor PUSCH on the uplink carrier in the current uplink sub-frame i, to generate the Type 2 PH of the uplink carrier in accordance with Equation 14 below;

$$PH_{type2,c}(i) = P_{CMAX,c}(i) - 10\log_{10}\left(10^{(10\log_{10}(M_{PUSCH,c}(i))+P_{O\_PUSCH,c}(j)+\alpha_c(j)\cdot PL_c+\Delta_{TF,c}(i)+f_c(i))/10} + 10^{(P_{0\_PUCCH,c}+PL_c+h_c(n_{CQI},n_{HARQ},n_{SR})+\Delta_{F\_PUCCH,c}(F)+\Delta_{TxD,c}(F')+g_c(i))/10}\right)[dB]; \quad \text{Equation 11}$$

wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $M_{PUSCH,c}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(10^{(10\log_{10}(M_{PUSCH,c}(i))+P_{O\_PUSCH,c}(j)+\alpha_c(j)\cdot PL_c+\Delta_{TF,c}(i)+f_c(i))/10} + 10^{(P_{O\_PUCCH,c}+PL_c+g_c(i))/10}\right)[dB];$$

Equation 12 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$ and $g_c(i)$ represent predefined parameters for calculating power of virtual PUCCH transmission in the current uplink sub-frame i on the uplink carrier c; and $M_{PUSCHc}(i)$, $P_{O\_PUSCH,c}(j)$, $\alpha_c(j)$, $PL_c$, $\Delta_{TF,c}(i)$ and $f_c(i)$ represent parameters for calculating power of the PUSCH transmitted in the current uplink sub-frame i on the uplink carrier c;

$$PH_{type2,c}(i) = P_{CMAX,c}(i) - 10\log_{10}\left(10^{(P_{O\_PUSCH,c}(1)+\alpha_c(1)\cdot PL_c+f_c(i))/10} + 10^{(P_{O\_PUCCH,c}+PL_c+h_c(n_{CQI},n_{HARQ},n_{SR})+\Delta_{F\_PUCCH,c}(F)+\Delta_{TxD,c}(F')+g_c(i))/10}\right)[dB];$$

Equation 13 wherein c represents the carrier index of the uplink carrier; $P_{CMAX,c}(i)$ represents maximum transmit power of the user equipment on the uplink carrier c in the current uplink sub-frame i, wherein power reductions for determining $P_{CMAX,c}(i)$ are determined according to the uplink transmission related information, in the current uplink sub-frame i, of all the uplink carriers; $P_{O\_PUCCH,c}$, $PL_c$, $h_c(n_{CQI},n_{HARQ},n_{SR})$, $\Delta_{F\_PUCCH,c}(F)$, $\Delta_{TxD,c}(F')$ and $g_c(i)$ represent parameters for calculating power of the PUCCH transmitted in the current uplink sub-frame i on the uplink carrier c; and $P_{O\_PUSCH,c}(1)$, $\alpha_c(1)$, $PL_c$ and $f_c(i)$ represent predefined parameters for calculating power of virtual PUSCH transmission in the current uplink sub-frame i on the uplink carrier c;

$$PH_{type2,c}(i) = \tilde{P}_{CMAX,c}(i) - 10\log_{10}\left(10^{(P_{O\_PUSCH,c}(1)+\alpha_c(1)\cdot PL_c+f_c(i))/10} + 10^{(P_{O\_PUCCH,c}+PL_c+g_c(i))/10}\right)[dB];$$

Equation 14 wherein c represents the carrier index of the uplink carrier; $\tilde{P}_{CMAX,c}(i)$ represents maximum transmit power of the user equipment on the uplink carrier c in the current uplink sub-frame i, wherein $\tilde{P}_{CMAX,c}(i)$ is determined assuming that the value of MPR is 0, the value of A-MPR is 0dB, the value of P-MPR is 0, and the value of $\Delta T_C$ is 0; and $P_{O\_PUSCH,c}(1)$, $\alpha_c(1)$, $PL_c$ and $f_c(i)$ represent predefined parameters for calculating power of virtual PUSCH transmission in the current uplink carrier i on the uplink carrier c; and $P_{O\_PUCCH,c}$, $PL_c$ and $g_c(i)$ represent predefined parameters for calculating power of virtual PUCCH transmission in the current uplink carrier i on the uplink carrier c.

16. The user equipment according to claim 15, wherein the first generating unit is further configured to report $\tilde{P}_{CMAX,c}(i)$ to a higher layer of the user equipment when the Type 1 PH of the uplink carrier is generated in accordance with Equation 2;
and/or
the third generating unit is further configured to report $\tilde{P}_{CMAX,c}(i)$ to a higher layer of the user equipment when the Type 1 PH of the uplink carrier is generated in accordance with Equation 9.

* * * * *

UNITED STATES PATENT AND TRADEMARK OFFICE
CERTIFICATE OF CORRECTION

PATENT NO. : 9,723,576 B2  
APPLICATION NO. : 14/763159  
DATED : August 1, 2017  
INVENTOR(S) : Xuejuan Gao et al.

Page 1 of 1

It is certified that error appears in the above-identified patent and that said Letters Patent is hereby corrected as shown below:

On the Title Page

In the assignee's name (73), please delete "TECHNOLOG" and insert --TECHNOLOGY-- instead.

Signed and Sealed this
Twenty-sixth Day of September, 2017

Joseph Matal
*Performing the Functions and Duties of the
Under Secretary of Commerce for Intellectual Property and
Director of the United States Patent and Trademark Office*